United States Patent
Nishikido

(10) Patent No.: US 10,200,640 B2
(45) Date of Patent: Feb. 5, 2019

(54) IMAGE SENSOR DEVICE

(71) Applicant: Renesas Electronics Corporation, Tokyo (JP)

(72) Inventor: Osamu Nishikido, Tokyo (JP)

(73) Assignee: Renesas Electroncis Corporation, Tokyo (JP)

( * ) Notice: Subject to any disclaimer, the term of this patent is extended or adjusted under 35 U.S.C. 154(b) by 0 days.

(21) Appl. No.: 16/053,064

(22) Filed: Aug. 2, 2018

(65) Prior Publication Data

US 2018/0343405 A1 Nov. 29, 2018

Related U.S. Application Data

(62) Division of application No. 15/221,458, filed on Jul. 27, 2016.

(30) Foreign Application Priority Data

Sep. 9, 2015 (JP) .................................. 2015-177575

(51) Int. Cl.
    *H04N 5/355* (2011.01)
    *H04N 9/04* (2006.01)
    *H04N 5/3745* (2011.01)

(52) U.S. Cl.
    CPC ..... *H04N 5/35581* (2013.01); *H04N 5/37452* (2013.01); *H04N 5/37457* (2013.01); *H04N 9/045* (2013.01)

(58) Field of Classification Search
    CPC . H04N 5/35581; H04N 9/045; H04N 5/37457
    See application file for complete search history.

(56) References Cited

U.S. PATENT DOCUMENTS

| | | | |
|---|---|---|---|
| 7,518,143 B2 | 4/2009 | Sugawa | |
| 8,179,459 B2 | 5/2012 | Koizumi | |
| 2004/0251394 A1 | 12/2004 | Rhodes et al. | |
| 2012/0050557 A1 | 3/2012 | Atanassiv et al. | |
| 2015/0319384 A1 | 11/2015 | Onishi | |

FOREIGN PATENT DOCUMENTS

| | | |
|---|---|---|
| JP | 4502278 B2 | 7/2010 |
| JP | 4931233 B2 | 5/2012 |

OTHER PUBLICATIONS

Office Action in U.S. Appl. No. 15/221,458 dated Feb. 14, 2018.
Office Action in U.S. Appl. No. 15/221,458 dated May 2, 2018.

*Primary Examiner* — Christopher K Peterson
(74) *Attorney, Agent, or Firm* — McGinn I.P. Law Group, PLLC

(57) ABSTRACT

An image sensor device includes a plurality of pixel cells arranged in a matrix in a pixel array, and a timing control circuit that controls read-out of pixel information from the plurality of pixel cells. Each of the plurality of pixel cells includes a photodiode, a transfer transistor provided between the photodiode and a floating diffusion, a node reset transistor provided between a power supply terminal and the floating diffusion, a read-out capacitor whose one end is connected to the power supply terminal, a capacitor reset transistor provided between another end of the read-out capacitor and the floating diffusion, an amplification transistor that amplifies a voltage generated based on electric charges accumulated in the floating diffusion, and a selection transistor provided between the amplification transistor and a read-out line.

8 Claims, 20 Drawing Sheets

|  | | | | |
|---|---|---|---|---|
| (n+1)-TH ROW PD1 | G1 | B | G1 | B |
| (n+1)-TH ROW PD0 | R | G0 | R | G0 |
| n-TH ROW PD1 | G1 | B | G1 | B |
| n-TH ROW PD0 | R | G0 | R | G0 |

Fig. 14

IMAGE SENSOR DEVICE

The present application is a Divisional Application of U.S. patent application Ser. No. 15/221,458, filed on Jul. 27, 2016, which is based on and claims priority from Japanese Patent Application No. 2015-177575, filed on Sep. 9, 2015, the entire contents of which are incorporated herein by reference.

BACKGROUND

The present invention relates to an image sensor device. For example, the present invention relates to an image sensor device that generates output image information with a dynamic range higher than a dynamic range which can be achieved by electric charges that can be accumulated during a one-time exposure by a photodiode that outputs image information in the image sensor device.

In recent years, in image sensor devices, a wide dynamic range of output image information is required. In this regard, examples of techniques for expanding a dynamic range are disclosed in Japanese Patent Nos. 4502278 and 4931233.

A solid-state imaging device disclosed in Japanese Patent No. 4502278 includes a photodiode that receives light and generates and accumulates photoelectric charges; a transfer transistor that transfers the photoelectric charges; a floating region to which the photoelectric charges are transferred via the transfer transistor; a storage capacitor element; and a storage transistor provided between the floating region and the storage capacitor element. In the solid-state imaging device disclosed in Japanese Patent No. 4502278, the storage transistor is turned on during an accumulation period of the photodiode, and allows the photoelectric charges, which overflow from the photodiode and flow to the floating region from the transfer transistor, to be accumulated in the storage capacitor element during the accumulation period. Further, during a transfer period subsequent to the accumulation period of the photodiode, the storage transistor is turned off. The transfer transistor is turned on during the transfer period, and allows the electric charges accumulated in the photodiode to be transferred to the floating region and accumulated in the floating region. During a period subsequent to the transfer period, the storage transistor is turned on and allows the electric charges, which are accumulated in the storage capacitor element and overflow, to be mixed with the electric charges accumulated in the floating region. Further, the storage transistor reads out the electric charges accumulated in the floating region before mixing, and also reads out the mixed electric charges after mixing.

An imaging apparatus disclosed in the specification of Japanese Patent No. 4931233 includes: a photoelectric conversion unit that generates electric charges by a photoelectric conversion and accumulates the generated electric charges; an electric charge accumulation unit that accumulates the electric charges overflowing from the photoelectric conversion unit; a read-out unit that reads out, a plurality of times, a signal based on the electric charges accumulated in the electric charge accumulation unit during a single electric charge accumulation period for the electric charges generated by the photoelectric conversion unit; and a reset switch that resets the electric charges accumulated in the charge accumulation unit after each reading by the read-out unit.

SUMMARY

However, in the techniques disclosed in Japanese Patent Nos. 4502278 and 4931233, the capacitance value of the capacitor for accumulating the electric charges overflowing from the photodiode when the photodiode is exposed to light is large. In other words, when the techniques disclosed in Japanese Patent Nos. 4502278 and 4931233 are used, there is a problem that the capacitor for accumulating the overflowing electric charges causes an increase in circuit area.

Other problems to be solved by and novel features of the present invention will become apparent from the following description and the accompanying drawings.

According to one embodiment, an image sensor device includes a read-out capacitor that accumulates first pixel information to be output from a photodiode which is exposed to light with a first exposure time. In addition to the first pixel information, second pixel information to be output from the photodiode which is exposed to light with a second exposure time longer than the first exposure time is generated. After the first pixel information and the second pixel information are read out separately, the two pieces of image information are synthesized to thereby generate output image information.

According to the one embodiment, it is possible to reduce a circuit area by reducing the capacitance value of the read-out capacitor.

BRIEF DESCRIPTION OF THE DRAWINGS

The above and other aspects, advantages and features will be more apparent from the following description of certain embodiments taken in conjunction with the accompanying drawings, in which:

FIG. 14 is a diagram for explaining a relationship between the arrangement of pixel cells and the arrangement of color filters provided in the image sensor device according to the third embodiment;

DETAILED DESCRIPTION

Figure 1:
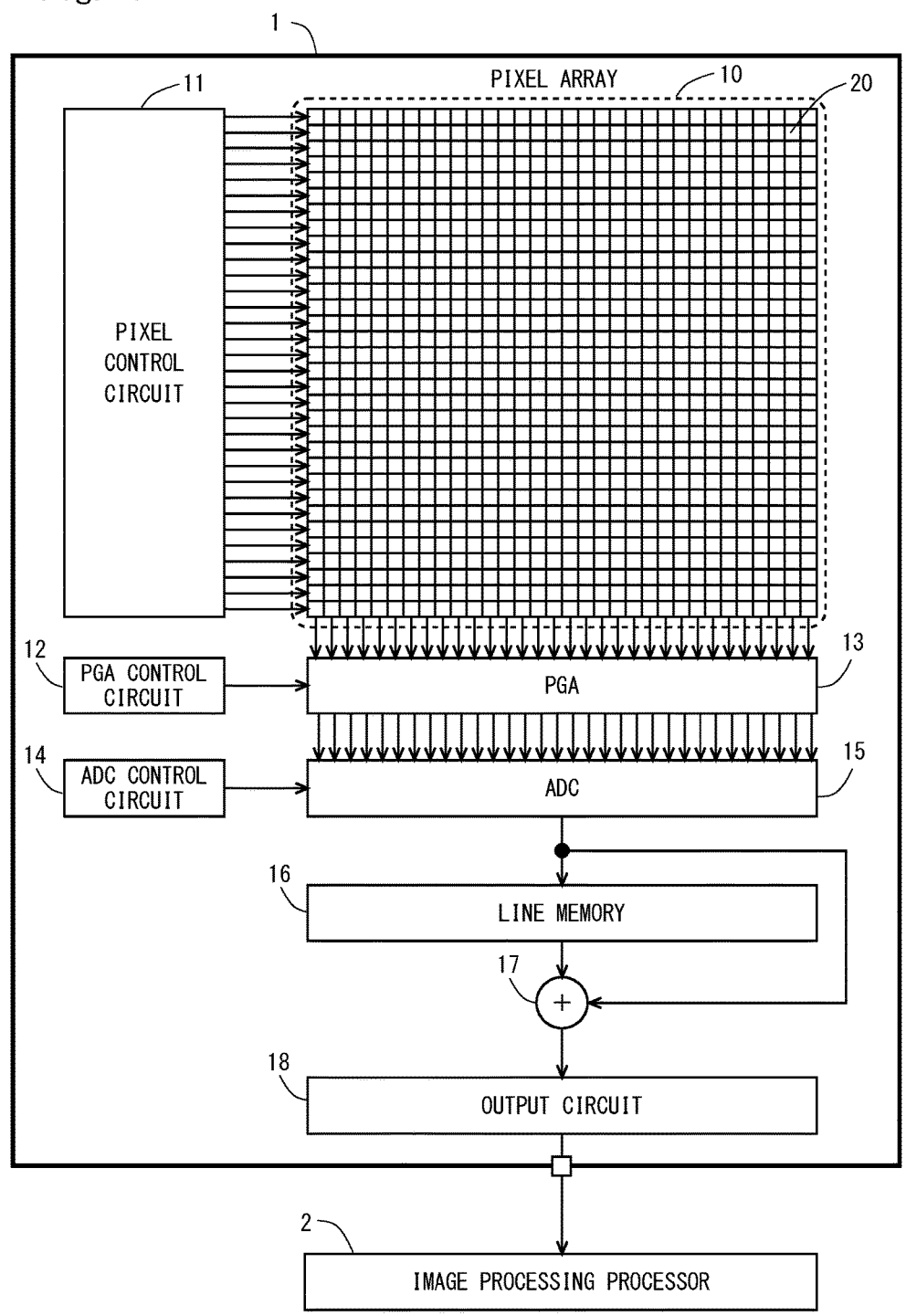
FIG. 1 is a block diagram showing an image sensor device according to a first embodiment.

The following description and the drawings are omitted and simplified as appropriate to clarify the explanation. As described below, pixel synthesis processing for synthesizing pixel information obtained with different exposure times is performed in an image sensor device. The processing can be implemented hardwarewise by a logic circuit, a CPU, a memory, and other circuits, and can be implemented softwarewise by a program or the like loaded into a memory. Accordingly, it is understood by those skilled in the art that the functional blocks can be achieved in various forms including hardware alone, software alone, and combinations thereof, and are not limited to any of them. Note that the same elements are designated by the same reference numerals throughout the drawings, and a repeated description is omitted as necessary.

The above-mentioned program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line, such as electric wires and optical fibers, or a wireless communication line.

FIG. 1 shows a block diagram of an image sensor device 1 according to a first embodiment. The block diagram of FIG. 1 also shows an image processing processor 2 to which output image information generated by the image sensor device 1 is output. The image processing processor 2 performs predetermined image processing on the output image information output from the image sensor device 1, and outputs image data to a higher-order system.

As shown in FIG. 1, the image sensor device 1 according to the first embodiment includes a pixel array 10, a timing control circuit (e.g., a pixel control circuit 11), a PGA control circuit 12, a variable gain amplifier 13, an ADC control circuit 14, an analog-to-digital conversion circuit 15, a line memory 16, an adder 17, and an output circuit 18.

The pixel array 10 includes a plurality of pixel cells 20 that are arranged in a matrix. The pixel control circuit 11 controls each row of the plurality of pixel cells 20 arranged in the pixel array 10. Specifically, the pixel control circuit 11 controls read-out of the pixel information from the plurality of pixel cells 20. The image sensor device 1 according to the first embodiment has first to third operation modes. The pixel control circuit 11 switches the timing of reading out the pixel information from the pixel cells 20 in each operation mode. The pixel control circuit 11 also performs control of an exposure time for the pixel cells 20 and control of a reset operation.

The first operation mode is an operation mode for generating the output image information by synthesizing results obtained by performing, a plurality of times, an exposure on a photodiode, which is included in each pixel cell 20, with different exposure times. For example, in the first operation mode, first pixel information (e.g., short-second-exposure pixel information) is generated based on information about electric charges accumulated in the photodiode with a first exposure time (e.g., a short second exposure), and second pixel information (e.g., long-second-exposure pixel information) is generated based on information about electric charges accumulated in the photodiode with a second exposure time (e.g., a long second exposure) which is longer than the first exposure time. In the first operation mode, the first pixel information and the second pixel information are synthesized to generate the output image information with a wide dynamic range. The first operation mode is also referred to as an HDR (High Dynamic Range) mode.

The second operation mode is an operation mode for generating the output image information based on a result of simultaneously performing an exposure on photodiodes which belong to a plurality of rows. In the second operation mode, the exposure is performed once. The second operation mode is also referred to as a global shutter mode.

The third operation mode is an operation mode for generating the output image information based on a result of performing a one-time exposure on each photodiode, while sequentially switching the rows of the photodiodes to be exposed to light. The third operation mode is also referred to as a one-time-exposure rolling shutter mode.

The PGA control circuit 12 performs the reset operation of the variable gain amplifier 13 and changes the gain setting thereof. The variable gain amplifier 13 amplifies the pixel information read out from the plurality of pixel cells 20 arranged in the pixel array 10, and outputs the amplified pixel information to the analog-to-digital conversion circuit 15. In this case, the pixel information input to the variable gain amplifier 13 is an analog value, and also the information output from the variable gain amplifier 13 includes an analog value. The ADC control circuit 14 controls the reset operation of the analog-to-digital conversion circuit 15 and the conversion processing timing of the analog-to-digital conversion circuit 15. The analog-to-digital conversion circuit 15 converts the pixel information, which is amplified by the variable gain amplifier 13, into a digital value. The line memory 16 holds the pixel information, which is included in the pixel information output from the analog-to-digital conversion circuit 15 and is obtained by the short second exposure, in an order in which the pixel information is output from the analog-to-digital conversion circuit 15. That is, the line memory 16 is a FIFO (First-In-First-Out) memory. The adder 17 adds the pixel information held in the line memory 16 and the pixel information which is included in the pixel information output from the analog-to-digital conversion circuit 15 and is obtained with the second exposure time (e.g., the long second exposure), and outputs the added pixel information as the output image information. The output circuit 18 is an output interface circuit of the image sensor device 1.

Figure 2:
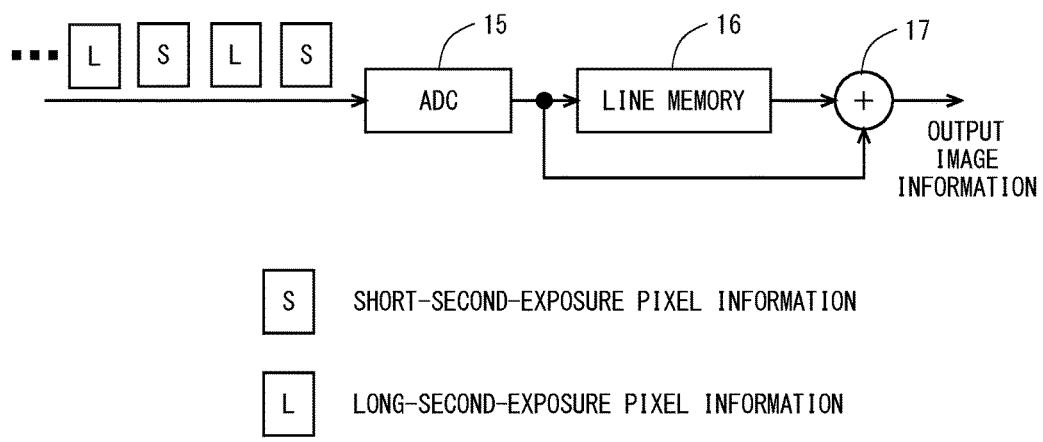
FIG. 2 is a block diagram showing the image sensor device according to the first embodiment and illustrating an operation for generating a high dynamic range image in the image sensor device.

In the global shutter mode and the one-time-exposure rolling shutter mode, the image sensor device 1 according to the first embodiment generates the output image information based on the pixel information output from the analog-to-digital conversion circuit 15, without using the line memory 16. In the HDR mode, the image sensor device 1 according to the first embodiment synthesizes the pieces of pixel information obtained with different exposure times using the line memory 16 and the adder 17. The synthesis processing will be described with reference to FIG. 2. FIG. 2 shows a block diagram of the image sensor device 1 and illustrates an operation of generating a high dynamic range image in the image sensor device 1.

As shown in FIG. 2, in the HDR mode, short-second-exposure pixel information S and long-second-exposure pixel information L are alternately output from the pixel cells 20. The analog-to-digital conversion circuit 15 sequentially converts the received pixel information into a digital value. The line memory 16 holds the short-second-exposure pixel information S. After that, the adder 17 adds the long-second-exposure pixel information L output from the analog-to-digital conversion circuit 15 and the short-second-exposure pixel information S which is held in the line memory 16 immediately before the long-second-exposure pixel information L is output, so that the image sensor device 1 generates the output image information.

Figure 3:
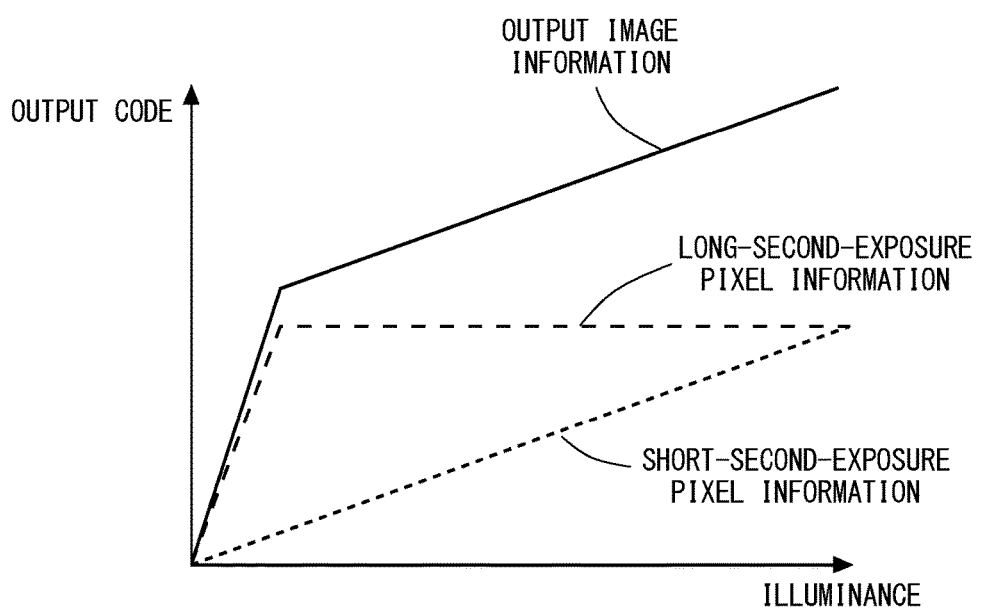
FIG. 3 is a graph for explaining a dynamic range of an output image and image information generated by the image sensor device according to the first embodiment.

Next, the dynamic range of the output image information in the HDR mode will be described. FIG. 3 shows a graph for explaining a dynamic range of an output image and pixel information generated by the image sensor device 1 according to the first embodiment.

As shown in FIG. 3, the output value of the short-second-exposure pixel information which is output in the HDR mode is not saturated until a high illuminance is reached, and an output code increases according to the illuminance. However, the short-second-exposure pixel information has a problem that deterioration of pixels, such as blocked up shadows, occurs in a low-luminance region. On the other hand, the long-second-exposure pixel information has a high resolution in the low-luminance region, but the output value is saturated at an illuminance lower than that of the short-second-exposure pixel information. Accordingly, in the HDR mode, the two pieces of image information are synthesized to generate the output image information in which the output value is not saturated until a high-luminance region is reached, while the resolution in the low-luminance region is increased.

Figure 4:
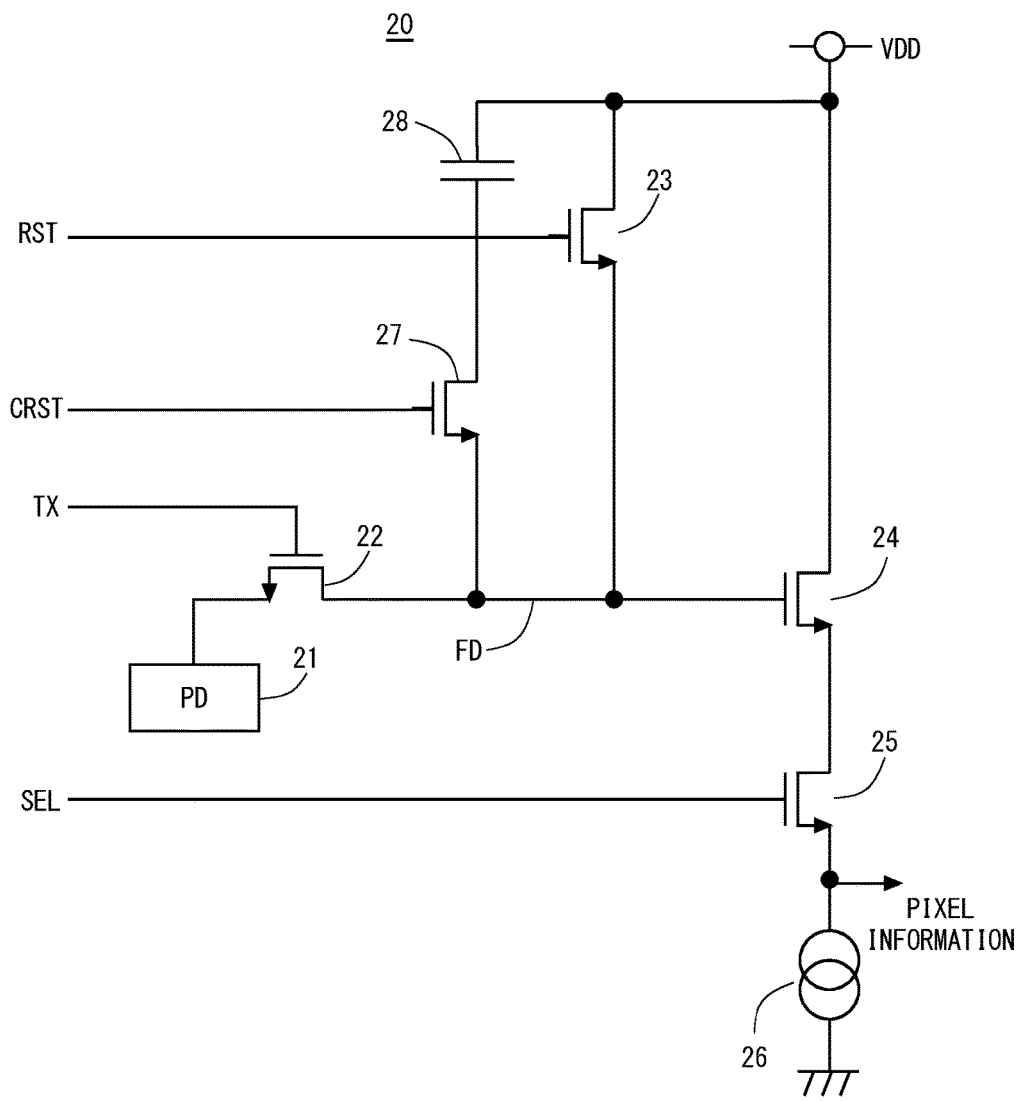
FIG. 4 is a circuit diagram showing a pixel cell of the image sensor device according to the first embodiment.

Next, the pixel cells 20 arranged in the pixel array 10 will be described in detail. In the image sensor device 1 according to the first embodiment, the pixel cells 20 having the same circuit configuration are arranged in a matrix in the pixel array 10. FIG. 4 shows a circuit diagram of one pixel cell 20 of the image sensor device 1 according to the first embodiment. As shown in FIG. 4, the pixel cell 20 includes a photodiode 21, a transfer transistor 22, a node reset transistor 23, an amplification transistor 24, a selection transistor 25, a current source 26, a capacitor reset transistor 27, and a read-out capacitor 28. In the pixel cell 20, a diffusion region and a line which connect the drain of the transfer transistor 22 to the gate of the amplification transistor 24 are referred to as a floating diffusion FD. Electric charges read out from the photodiode 21 are accumulated in the floating diffusion PD. The amplification transistor 24 generates the pixel information based on a voltage generated based on the accumulated electric charges.

The transfer transistor 22 is provided between the photodiode 21 and the floating diffusion FD. The transfer transistor 22 is supplied with a transfer control signal TX from the pixel control circuit 11. The node reset transistor 23 is provided between a power supply terminal VDD and the floating diffusion FD. The node reset transistor 23 is supplied with a reset signal RST from the pixel control circuit 11.

The amplification transistor 24 is provided between the power supply terminal VDD and the selection transistor 25. The gate of the amplification transistor 24 is connected to the floating diffusion FD. The amplification transistor 24 amplifies the voltage generated based on the electric charges accumulated in the floating diffusion FD. The selection transistor 25 is provided between the amplification transistor 24 and the current source 26. A node connecting the selection transistor 25 and the current source 26 to each other is connected to a read-out line (not shown). The gate of the selection transistor 25 is supplied with a cell selection signal SEL from the pixel control circuit 11. The current source 26 is provided between a ground terminal and the selection transistor 25.

The capacitor reset transistor 27 is provided between the other end of the read-out capacitor 28 and the floating diffusion FD. The gate of the capacitor reset transistor 27 is supplied with a capacitor reset signal CRST from the pixel control circuit 11. One end of the read-out capacitor 28 is connected to the power supply terminal VDD.

Figure 5:
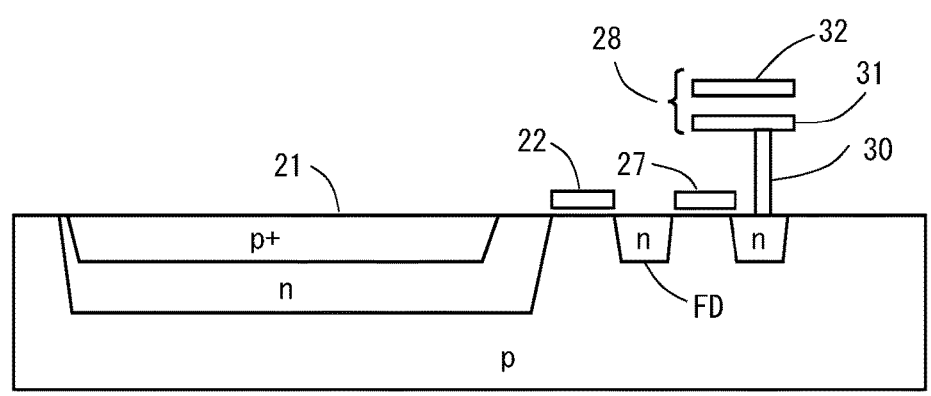
FIG. 5 is a sectional view showing the image sensor device according to the first embodiment and illustrating a structure of a read-out capacitor in the image sensor device.

Each pixel cell 20 has a feature that the read-out capacitor 28 is formed using a parasitic capacitance of a line located in a wiring layer which is formed above a semiconductor substrate on which the pixel cell 20 is formed. The configuration of the read-out capacitor 28 will be described in detail. FIG. 5 shows a sectional view of the image sensor device according to the first embodiment and illustrates the structure of the read-out capacitor in the image sensor device.

FIG. 5 shows only the photodiode 21, the transfer transistor 22, the capacitor reset transistor 27, and the read-out capacitor 28, which are necessary to explain the configuration of the read-out capacitor 28. However, other elements are also formed on the semiconductor substrate. As shown in FIG. 5, the photodiode 21 is composed of an n-type diffusion layer formed in a p-type semiconductor substrate, and a p+ diffusion layer formed in the n-type diffusion layer. The diffusion layer which forms the source of the transfer transistor 22 is formed as the n-type diffusion layer of the photodiode 21. The n-type diffusion layer serving as the drain of the transfer transistor 22 forms the floating diffusion FD. The n-type diffusion layer serving as the drain of the transfer transistor 22 also functions as the source of the capacitor reset transistor 27. A contact 30 is connected to the n-type diffusion layer serving as the drain of the capacitor reset transistor 27. A first layer line 31 is formed at an end of the contact 30. A second layer line 32 is formed at a location opposite to the first layer line 31. An interlayer insulating film is formed between the first layer line 31 and the second layer line 32. The read-out capacitor 28 is formed by using the first layer line 31 and the second layer line 32 as electrodes and using the interlayer insulation film formed between the first layer line 31 and the second layer line 32 as a dielectric material.

Thus, the read-out capacitor 28 is formed by using the parasitic capacitance of the line, which leads to a reduction in the circuit area of the image sensor device 1. In the image sensor device 1 according to the first embodiment, the pixel control circuit 11 controls the pixel cells 20 in consideration of the exposure time, thereby ensuring a sufficiently wide dynamic range even when the capacitance value of the read-out capacitor 28 is small. In this regard, a control sequence for the pixel cells 20 by the pixel control circuit 11 in the image sensor device 1 will be described below.

Figure 6:
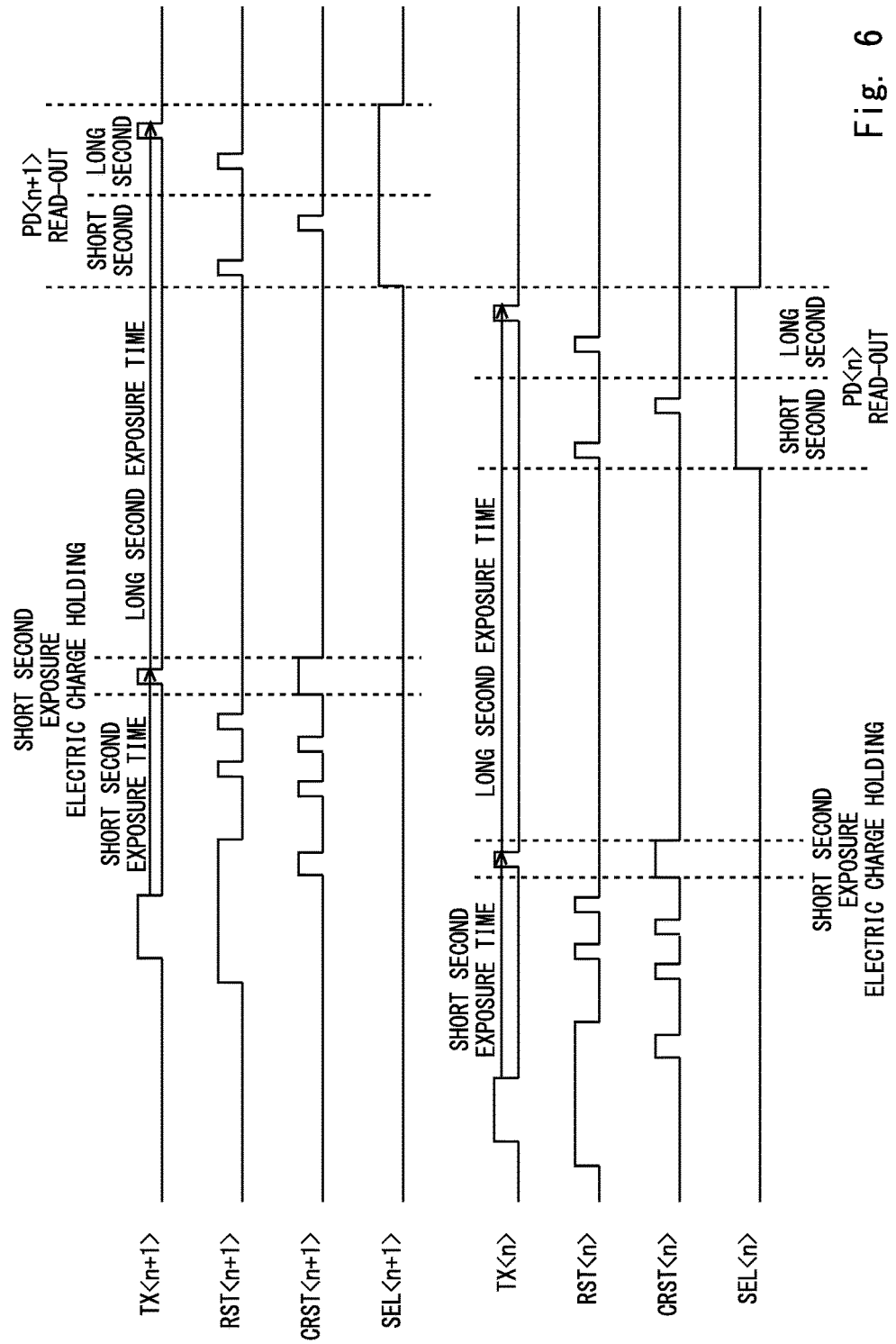
FIG. 6 is a timing diagram for explaining an operation in a first operation mode of the image sensor device according to the first embodiment.
Figure 7:
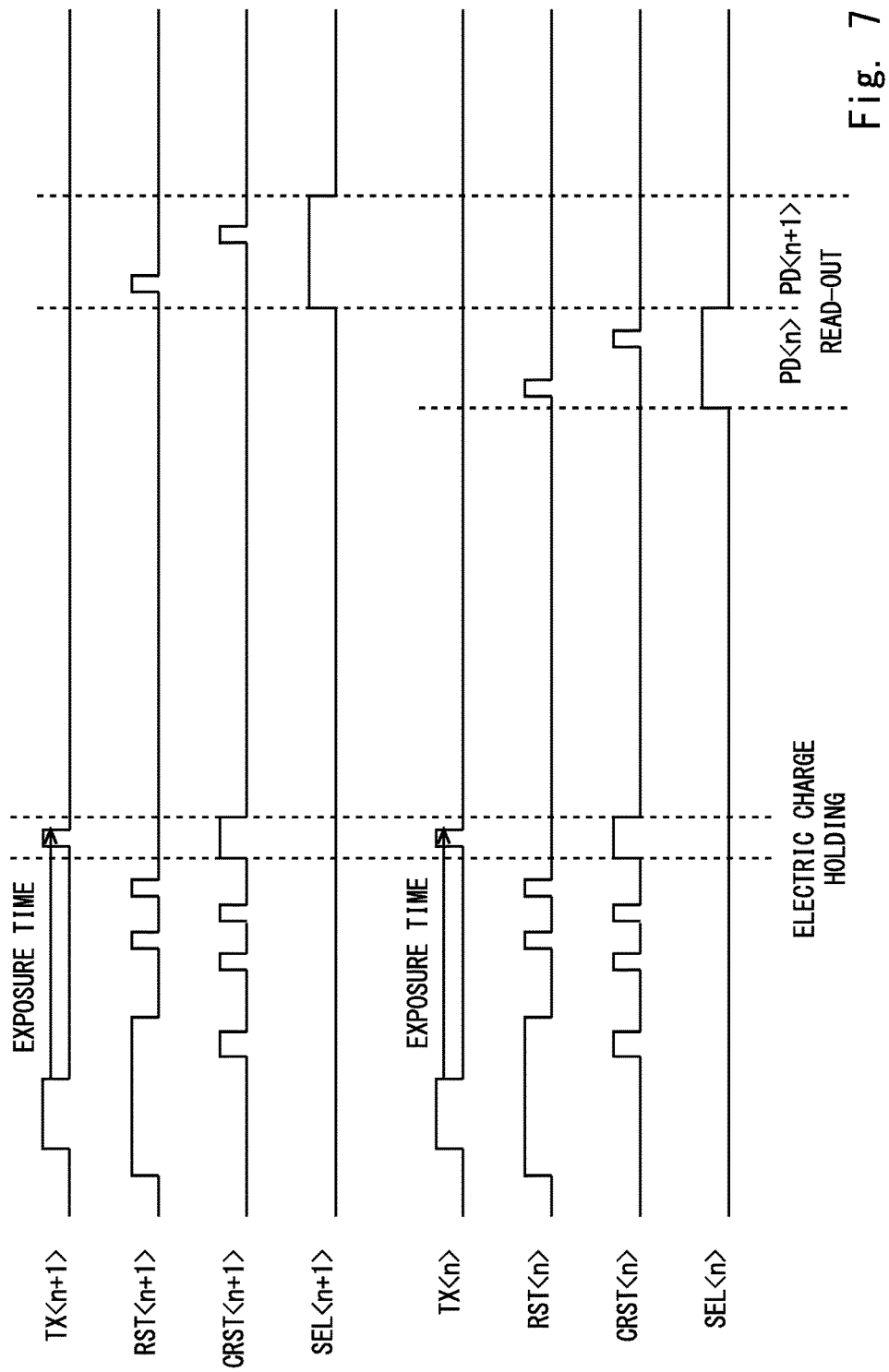
FIG. 7 is a timing diagram for explaining an operation in a second operation mode of the image sensor device according to the first embodiment.
Figure 8:
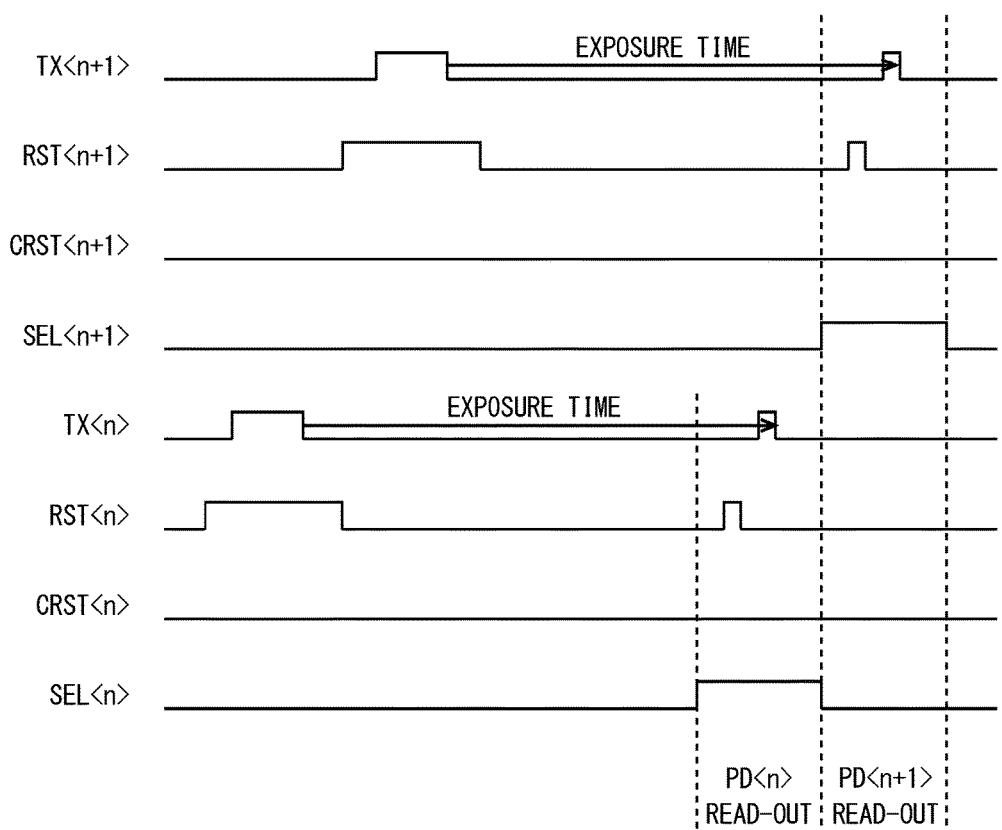
FIG. 8 is a timing diagram for explaining an operation in a third operation mode of the image sensor device according to the first embodiment.

The image sensor device 1 according to the first embodiment includes three operation modes, i.e., the HDR mode, the global shutter mode, and the one-time-exposure rolling shutter mode. The control sequence for the pixel cells 20 by the image sensor device 1 in each operation mode will be described below. The control sequence will be described with reference to FIGS. 6 to 8. In FIGS. 6 to 8, n represents the row number of each row in which the pixel cells 20 are arranged.

FIG. 6 shows a timing diagram for explaining an operation in the first operation mode (e.g., the HDR mode) of the image sensor device 1 according to the first embodiment. In the image sensor device 1 according to the first embodiment, the pixel control circuit 11 controls the pixel cells 20 by switching the logic level of each of the transfer control signal TX, the reset signal RST, the capacitor reset signal CRST, and the cell selection signal SEL. As shown in FIG. 6, in the HDR mode, the pixel control circuit 11 controls the pixel cells 20 so that the operation of reading out the pixel information from the pixel cells 20 can be executed at different timings for each row. More specifically, the pixel control circuit 11 controls the pixel cells 20 for each row so that the pixel information in adjacent rows can be continuously read out. In the image sensor device 1, the control sequences for the respective rows by the pixel control circuit 11 are the same. Accordingly, the control sequence for the pixel cells 20 arranged in an n-th row will be described below with reference to FIG. 6.

As shown in FIG. 6, the pixel control circuit 11 first resets pixels. In this reset operation, the reset signal RST is set to a high level and the node reset transistor 23 is switched to a conductive state. The transfer control signal TX is set to the high level during a period in which a power supply voltage is supplied to the floating diffusion FD via the node reset transistor 23, and the transfer transistor 22 is switched to the conductive state, thereby resetting the photodiode 21. After that, the transfer control signal TX is switched to a low level to switch the transfer transistor 22 to a cut-off state, thereby starting the exposure of the photodiode 21. In the example shown in FIG. 6, a short time exposure is first performed.

The capacitor reset signal CRST is set to the high level to switch the capacitor reset transistor 27 to the conductive state, while the node reset transistor 23 is maintained in the conductive state. Thus, the read-out capacitor 28 is reset. After the operation of resetting the read-out capacitor 28 is completed, the reset signal RST and the capacitor reset signal CRST are temporarily switched to the low level. After that, the reset signal RST and the capacitor reset signal CRST are alternately set to the high level during a period in which the short second exposure is performed, thereby allowing the image sensor device 1 to adjust the reset level of each of the floating diffusion FD and the read-out capacitor 28.

Then, after a lapse of the short second exposure time, the transfer control signal TX and the capacitor reset signal CRST are both switched to the high level. As a result, the transfer transistor 22 and the capacitor reset transistor 27 are switched to the conductive state, so that the electric charges generated by the photodiode 21 are transferred to the read-out capacitor 28 and the short-second-exposure pixel information is held in the read-out capacitor 28.

Next, a long second exposure operation for causing the photodiode 21 to be exposed to light during a long second exposure time is started by switching the transfer control signal TX from the high level to the low level. During the long second exposure operation, the image sensor device 1 performs a first read-out operation for reading out the short-second-exposure pixel information held in the read-out capacitor 28. In the first read-out operation, the cell selection signal SEL and the capacitor reset signal CRST are set to the high level, thereby switching the capacitor selection transistor 25 and the reset transistor 27 to the conductive state. Accordingly, the short-second-exposure pixel information held in the read-out capacitor 28 is transferred to the floating diffusion FD. Each pixel cell 20 outputs the short-second-exposure pixel information, which is generated in such a manner that the amplification transistor 24 amplifies the voltage of the floating diffusion FD, to the read-out line via the selection transistor 25. Note that in the first read-out operation, the reset operation for resetting the floating diffusion RF by setting the reset signal RST to the high level before switching the capacitor reset transistor 27 to the conductive state is performed. The short-second-exposure pixel information held in the read-out capacitor 28 and the short-second-exposure pixel information output from the pixel cell 20 have different voltage levels, but they are the same type of pixel information. Accordingly, they are given the same name, regardless of the difference between the voltage levels.

Then, the image sensor device 1 performs a second read-out operation for outputting the long-second-exposure pixel information after a lapse of the long second exposure time. In the second read-out operation, the cell selection signal SEL and the transfer control signal TX are set to the high level, thereby switching the capacitor selection transistor 25 and the photodiode 21 to the conductive state. Accordingly, the long-second-exposure pixel information generated by the photodiode 21 is transferred to the floating diffusion FD. Each pixel cell 20 outputs the long-second-exposure pixel information, which is generated in such a manner that the amplification transistor 24 amplifies the voltage of the floating diffusion FD, to the read-out line via the selection transistor 25. Note that in the second read-out operation, the reset operation for resetting the floating diffusion FD by setting the reset signal RST to the high level before switching the photodiode 21 to the conductive state is performed. The long-second-exposure pixel information generated by the photodiode 21 and the long-second-exposure pixel information output from the pixel cell 20 have different voltage levels, but they are the same type of pixel information. Accordingly, they are given the same name, regardless of the difference between the voltage levels.

As shown in FIG. 6, the image sensor device 1 according to the first embodiment controls the timing of executing the first read-out operation so that the first read-out operation and the second read-out operation can be continuously performed. The image sensor device 1 according to the first embodiment also controls the timing of executing the read-out operations for each row so that the read-out operations can be continuously performed in each row. Thus, the pixel information is continuously read out from the pixel cells 20 belonging to the same column in the pixel array 10, which leads to an increase in frame rate. Since the first read-out operation and the second read-out operation are continuously performed on one pixel cell 20, in the example shown in FIG. 6, the cell selection signal SEL is maintained at the high level during the period in which the first read-out operation and the second read-out operation are performed. Consequently, power consumption due to switching of the logic level of each signal can be reduced.

As described above, in the image sensor device 1 according to the first embodiment, in the HDR mode, the pixel control circuit 11 controls the pixel cells 20 in such a manner that the transfer transistor 22 is switched to the cut-off state and the photodiode 21 is exposed to light with the first exposure time, and then the capacitor reset transistor 27 and the transfer transistor 22 are switched to the conductive state to cause the electric charges accumulated in the photodiode 21 to be accumulated in the read-out capacitor 28. Further, the pixel control circuit 11 controls the pixel cells 200 in such a manner that the capacitor reset transistor 27 and the transfer transistor 22 are switched from the conductive state to the cut-off state and the photodiode 21 is further exposed to light with the second exposure time. Furthermore, the pixel control circuit 11 controls the pixel cells 20 in such a manner that the first read-out operation for switching the selection transistor 25 and the capacitor reset transistor 27 from the cut-off state to the conductive state during the period of the second exposure time and for outputting the first pixel information accumulated in the read-out capacitor 28 to the read-out line is performed. Moreover, the pixel control circuit 11 controls the pixel cells 20 in such a manner that the second read-out operation for switching the capacitor reset transistor 27 to the cut-off state after a lapse of the second exposure time and for switching the transfer transistor 22 and the selection transistor 25 to the conductive state to cause the second pixel information to be output to the read-out line from the photodiode 21 is performed.

The capacitance value of the read-out capacitor 28 will now be described. In the HDR mode, as described above, the short-second-exposure pixel information is temporarily held in the read-out capacitor 28. In this holding operation, the short-second-exposure pixel information is stored in a combined capacitance which is obtained by combining the capacitance values of the read-out capacitor 28 and the floating diffusion FD. The voltage level of the short-second-exposure pixel information stored in the combined capacitance is (the capacitance of the floating diffusion FD/the combined capacitance) times the voltage level of the pixel information which is output without using the read-out capacitor 28. When the pixel information temporarily held in the read-out capacitor 28 is read out and output to the floating diffusion FD, the floating diffusion FD is reset by the reset operation before the read-out operation. Accordingly, the voltage level of the pixel information is (the capacitance of the read-out capacitor 28/the combined capacitance) times the voltage level of the pixel information accumulated in the read-out capacitor 28. In other words, the voltage level of the pixel information temporarily accumulated in the read-out capacitor 28 is (the capacitance of the floating diffusion FD/the combined capacitance)×(the capacitance of the floating diffusion FD/the combined capacitance) times the voltage level of the pixel information which is output without using the read-out capacitor 28.

By setting the capacitance of the floating diffusion FD to be equal to the capacitance of the read-out capacitor 28, the voltage level of the pixel information temporarily accumulated in the read-out capacitor 28 can be maximized. In this case, the voltage level of the pixel information output after it is temporarily accumulated in the read-out capacitor 28 is equal to one-quarter of the voltage level of the pixel information output without using the read-out capacitor 28. Therefore, the variable gain amplifier 13 amplifies the pixel information (e.g., the short-second-exposure pixel information), which is output after it is temporarily accumulated in the read-out capacitor 28, with a gain which is four times that of the long-second-exposure pixel information, thereby making it possible to perform analog-to-digital conversion processing on the short-second-exposure pixel information and the long-second-exposure pixel information under the same conditions.

FIG. 7 shows a timing diagram for explaining an operation in the second operation mode (e.g., the global shutter mode) of the image sensor device 1 according to the first embodiment. As shown in FIG. 7, in the global shutter mode, the pixel control circuit 11 controls the pixel cells 20 in such a manner that the photodiodes 21 arranged in the pixel array 10 are collectively exposed to light, and then the pixel information obtained by the exposure is read out at different timings for each row.

As shown in FIG. 7, the pixel control circuit 11 first resets pixels. In this reset operation, the reset signal RST is set to the high level and the node reset transistor 23 is switched to the conductive state. Further, the transfer control signal TX is set to the high level during a period in which the power supply voltage is supplied to the floating diffusion FD via the node reset transistor 23, and the transfer transistor 22 is switched to the conductive state, thereby resetting each photodiode 21. After that, the transfer control signal TX is switched to the low level to switch the transfer transistor 22 to the cut-off state, thereby starting the exposure of the photodiode 21.

The capacitor reset signal CRST is set to the high level to switch the capacitor reset transistor 27 to the conductive state, while the node reset transistor 23 is maintained in the conductive state. Thus, the read-out capacitor 28 is reset. After the operation of resetting the read-out capacitor 28 is completed, the reset signal RST and the capacitor reset signal CRST are temporarily switched to the low level. After that, the reset signal RST and the capacitor reset signal CRST are alternately set to the high level during a period in which the exposure is performed, thereby allowing the image sensor device 1 to adjust the reset level of each of the floating diffusion FD and the read-out capacitor 28.

Then, after a lapse of the exposure time, the transfer control signal TX and the capacitor reset signal CRST are both switched to the high level. As a result, the transfer transistor 22 and the capacitor reset transistor 27 are switched to the conductive state, so that the electric charges generated by the photodiode 21 are transferred to the read-out capacitor 28 and the pixel information is held in the read-out capacitor 28.

After that, the image sensor device 1 performs a read-out operation for reading out the pixel information held in the read-out capacitor 28. In the read-out operation, the cell selection signal SEL and the capacitor reset signal CRST are set to the high level, thereby switching the capacitor selection transistor 25 and the reset transistor 27 to the conductive state. Accordingly, the pixel information held in the read-out capacitor 28 is transferred to the floating diffusion FD. Each pixel cell 20 outputs the pixel information, which is generated in such a manner that the amplification transistor 24 amplifies the voltage of the floating diffusion FD, to the read-out line via the selection transistor 25. Note that in the read-out operation, a reset operation for resetting the floating diffusion FD by setting the reset signal RST to the high level before switching the capacitor reset transistor 27 to the conductive state is performed. The pixel information held in the read-out capacitor 28 and the pixel information output from the pixel cell 20 have different voltage levels, but they are the same type of pixel information. Accordingly, they are given the same name, regardless of the difference between the voltage levels.

As shown in FIG. 7, the image sensor device 1 according to the first embodiment controls the timing of executing the read-out operation so that the read-out operations for the pixel cells 20 arranged in each row are performed continuously in sequence. Thus, the pixel information is continuously read out from the pixel cells 20 belonging to the same column in the pixel array 10, which leads to an increase in frame rate.

As described above, in the image sensor device 1 according to the first embodiment, in the global shutter mode, the pixel control circuit 11 collectively controls the pixel cells 20 in such a manner that the capacitor reset transistors 27 of the plurality of pixel cells 20 are switched from the cut-off state to the conductive state after the exposure of each photodiode is completed, and the pixel information output from each photodiode is held in the corresponding read-out capacitor 28. Further, the pixel control circuit 11 controls the pixel cells 20 in such a manner that the selection transistor 25 and the capacitor reset transistor 27 are sequentially switched to the conductive state for each row and the pixel information held in the read-out capacitor 28 is read out.

FIG. 8 shows a timing diagram for explaining an operation in the third operation mode (e.g., the one-time-exposure rolling shutter mode) of the image sensor device 1 according to the first embodiment. As shown in FIG. 8, in the one-time-exposure rolling shutter mode, the pixel control circuit 11 controls the pixel cells 20 in such a manner that the photodiodes 21 arranged in the pixel array 10 are sequentially exposed to light and the pixel information obtained by the exposure is sequentially read out for each row. Note that in the one-time-exposure rolling shutter mode, the read-out capacitor 28 is not used, and thus the capacitor reset signal CRST is maintained at the low level.

As shown in FIG. 8, the pixel control circuit 11 first resets pixels. In this reset operation, the reset signal RST is set to the high level and the node reset transistor 23 is switched to the conductive state. Further, the transfer control signal TX is set to the high level during a period in which the power supply voltage is supplied to the floating diffusion FD via the node reset transistor 23, and the transfer transistor 22 is switched to the conductive state, thereby resetting each photodiode 21. After that, the transfer control signal TX is switched to the low level to switch the transfer transistor 22 to the cut-off state, thereby starting the exposure of the photodiode 21.

Then, after a lapse of the exposure time, the image sensor device 1 performs a read-out operation for reading out the pixel information generated by the photodiode 21. In the read-out operation, the cell selection signal SEL and the transfer control signal TX are set to the high level, thereby switching the transfer transistor 22 and the capacitor selection transistor 25 to the conductive state. Thus, the pixel information generated by the photodiode 21 is transferred to the floating diffusion FD. Each pixel cell 20 outputs the pixel information, which is generated in such a manner that the amplification transistor 24 amplifies the voltage of the floating diffusion FD, to the read-out line via the selection transistor 25. Note that in the read-out operation, a reset operation for resetting the floating diffusion FD by setting the reset signal RST to the high level before switching the transfer transistor 22 to the conductive state is performed. The pixel information generated by the photodiodes 21 and the pixel information output from the pixel cells 20 have different voltage levels, but they are the same type of pixel information. Accordingly, they are given the same name, regardless of the difference between the voltage levels.

As shown in FIG. 8, the image sensor device 1 according to the first embodiment controls the timing of executing the read-out operation so that the read-out operations for the pixel cells 20 arranged in each row are performed continuously in sequence. Thus, the pixel information is continuously read out from the pixel cells 20 belonging to the same column in the pixel array 10, which leads to an increase in frame rate.

As described above, in the image sensor device 1 according to the first embodiment, in the one-time-exposure rolling shutter mode, the pixel control circuit 11 controls the pixel cells 20 in such a manner that the transfer transistor 22 and the selection transistor 25 are switched to the conductive state, while the capacitor reset transistor 27 is maintained in the cut-off state after the exposure of the photodiode 21 is completed, and the pixel information output from the photodiode 21 is output to the read-out line.

As described above, in the image sensor device 1 according to the first embodiment, in the HDR mode for outputting the output image information with a wide dynamic range, the exposure operation is performed a plurality of times (for example, twice) with different exposure times; the short-second-exposure pixel information obtained in a first exposure operation is held in the read-out capacitor 28; and the short-second-exposure pixel information held in the read-out capacitor 27 is output during a period in which a second exposure operation is performed. The image sensor device 1 according to the first embodiment outputs the output image information with a wide dynamic range by synthesizing the short-second-exposure pixel information with the long-second-exposure pixel information. By performing the operations described above, the image sensor device 1 according to the first embodiment can expand the dynamic range of the output image information, while reducing the capacitance value of the read-out capacitor 28.

The capacitance value of the read-out capacitor 28 will now be described in detail. As described above, in the image sensor device 1 according to the first embodiment, the capacitance value of the read-out capacitor 28 is preferably about the same as the capacitance value of the floating diffusion FD. In other words, the capacitance value of the read-out capacitor 28 can be reduced regardless of the width of the dynamic range of the output image information. In Japanese Patent Nos. 4502278 and 4931233, however, in order to expand the dynamic range, it is necessary to increase the capacitance value of the capacitor, which accumulates electric charges overflowing from the photodiode, according to the dynamic range width. For example, in Japanese Patent Nos. 4502278 and 4931233, in order to achieve the same dynamic range as that of the image sensor device 1 according to the first embodiment, the image sensor device 1 needs to have a capacitance that is about 1000 times that of the read-out capacitor 28. Such a difference between the capacitance values is caused because there are two differences between the image sensor device 1 according to the first embodiment and the image sensor devices disclosed in Japanese Patent Nos. 4502278 and 4931233. The first difference is that it is possible for the image sensor device 1 according to the first embodiment to expand the dynamic range, while reducing the exposure time, by synthesizing the pieces of pixel information obtained by performing the exposure operation twice, i.e., the short second exposure and the long second exposure, with the result that the amount of electric charge for generating the pixel information can be suppressed. The second difference is that in the circuit configuration of each pixel cell 20 according to the first embodiment, the capacitance value at which the gain of the pixel information accumulated in the read-out capacitor 28 becomes the largest is about the same as the capacitance value of the floating diffusion FD.

Thus, in the image sensor device 1 according to the first embodiment, the circuit area can be reduced by reducing the capacitance value of the read-out capacitor 28. Since a large number of pixel cells 20 are arranged in the pixel array 10 in the image sensor device 1, a reduction in the circuit area of the pixel cells 20 leads to a drastic reduction in the chip area of the image sensor device 1. Further, since the size of the read-out capacitor 28 can be reduced in each pixel cell 20, the element size of the photodiode 21 is increased by forming the photodiode 21 in a vacant region, thereby achieving the image sensor device with low noise and high sensitivity.

The image sensor device 1 according to the first embodiment can have the global shutter mode that allows the plurality of pixel cells 20 arranged in the pixel array 10 to be collectively exposed to light. This is because the pixel information output from each of the photodiodes, which are collectively exposed to light, can be held in the read-out capacitor 28 until the reading processing is completed. In the case of implementing the global shutter mode in the techniques disclosed in Japanese Patent Nos. 4502278 and 4931233, the capacitance value of the capacitor that accumulates the electric charges overflowing from the photodiode is extremely large, which causes a problem that the sensitivity of the image sensor device considerably deteriorates. On the other hand, in the image sensor device 1 according to the first embodiment, the capacitance value of the read-out capacitor 28 is small and the voltage level of the pixel information temporarily accumulated in the read-out capacitor 28 can be maintained at the high level, so that the sensitivity can be increased in comparison with the techniques disclosed in Japanese Patent Nos. 4502278 and 4931233.

Furthermore, the image sensor device 1 according to the first embodiment can achieve the three operation modes, i.e., the HDR mode, the global shutter mode, and the one-time-exposure rolling shutter mode, only by changing the control sequence for each pixel cell 20. In the image sensor device 1 according to the first embodiment, a CDS operation (correlated double sampling operation) for reading out the voltage level of the pixel information after the reset level is read out can be performed in any of the three operation modes. In other words, in the image sensor device 1 according to the first embodiment, the operation mode can be changed without changing the operation (for example, an analog-to-digital conversion operation) other than the control sequence for each pixel cell 20. Thus, in the image sensor device 1 according to the first embodiment, the operation mode can be changed without providing any extra additional circuit. The CDS operation is an operation for reading out a signal value, reading out a noise component (reset level), and calculating a difference between the signal value and the noise component.

Second Embodiment

Figure 9:
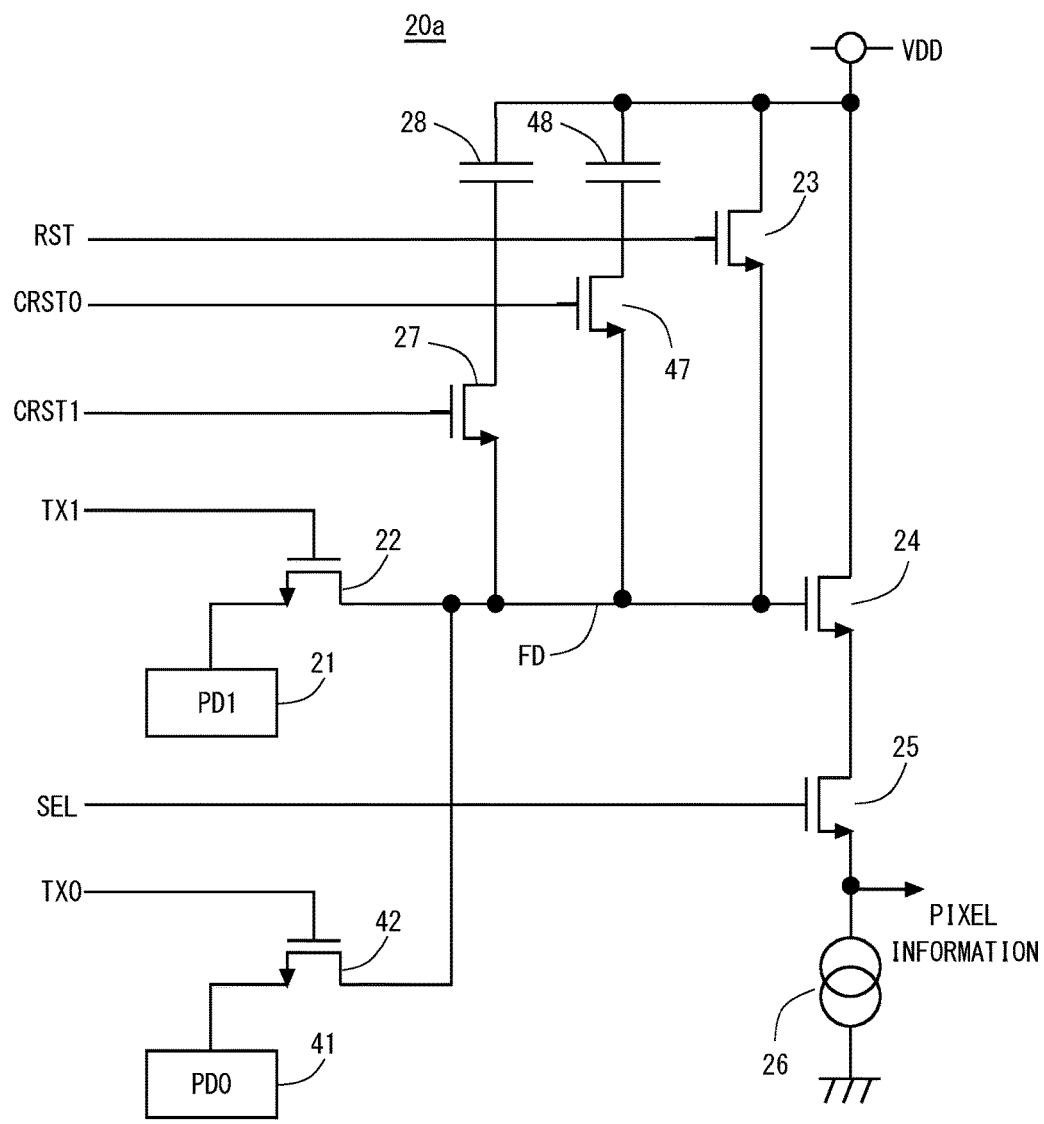
FIG. 9 is a circuit diagram showing a pixel cell of an image sensor device according to a second embodiment.

In a second embodiment, a pixel cell 20a will be described as another form of the pixel cell 20. FIG. 9 shows a circuit diagram of a pixel cell of an image sensor device according to the second embodiment. The components in the second embodiment that are the same as those described in the first embodiment are denoted by the same reference numerals, and descriptions thereof are omitted.

As shown in FIG. 9, the pixel cell 20a according to the second embodiment has a configuration in which a photodiode 41, a transfer transistor 42, a capacitor reset transistor 47, and a read-out capacitor 48 are added to the pixel cell 20 according to the first embodiment. Assuming that the photodiode 21 is a first photodiode, the photodiode 41 is referred to as a second photodiode. Assuming that the transfer transistor 22 is a first transfer transistor, the transfer transistor 42 is referred to as a second transfer transistor. Assuming that the capacitor reset transistor 27 is a first capacitor reset transistor, the capacitor reset transistor 47 is referred to as a second capacitor reset transistor. Assuming that the read-out capacitor 28 is a first read-out capacitor, the read-out capacitor 48 is referred to as a second read-out capacitor.

The transfer transistor 42 is provided between the photodiode 41 and the floating diffusion FD. The gate of the transfer transistor 42 is supplied with a transfer control signal TX0. The gate of the transfer transistor 22 is supplied with a transfer control signal TX1.

One end of the read-out capacitor 48 is connected to the power supply terminal VDD, and the other end of the read-out capacitor 48 is connected to the floating diffusion FD via the capacitor reset transistor 47. The gate of the capacitor reset transistor 47 is supplied with a capacitor reset signal CRST0. The gate of the capacitor reset transistor 27 is supplied with a capacitor reset signal CRST1.

In the image sensor device according to the second embodiment, various signals for controlling the pixel cell 20a are output from the pixel control circuit 11. As shown in FIG. 9, the pixel cell 20a is obtained by expanding the configuration of the pixel cell 200 in such a manner that two photodiodes are provided in one pixel cell. The control sequence for the pixel cell 20a is the same as the control sequence for one photodiode. However, since two photodiodes are provided in one pixel cell, a device for shifting the timing of the control sequence between the photodiodes within one pixel cell is needed. The control sequence of the image sensor device according to the second embodiment will now be described below. In the description of the control sequence according to the second embodiment, only the control sequence for pixel cells belonging to one row will be described. Shifting of the timing of the control sequence between rows is performed in the same way as in the control sequence for the pixel cells according to the first embodiment.

Figure 10:
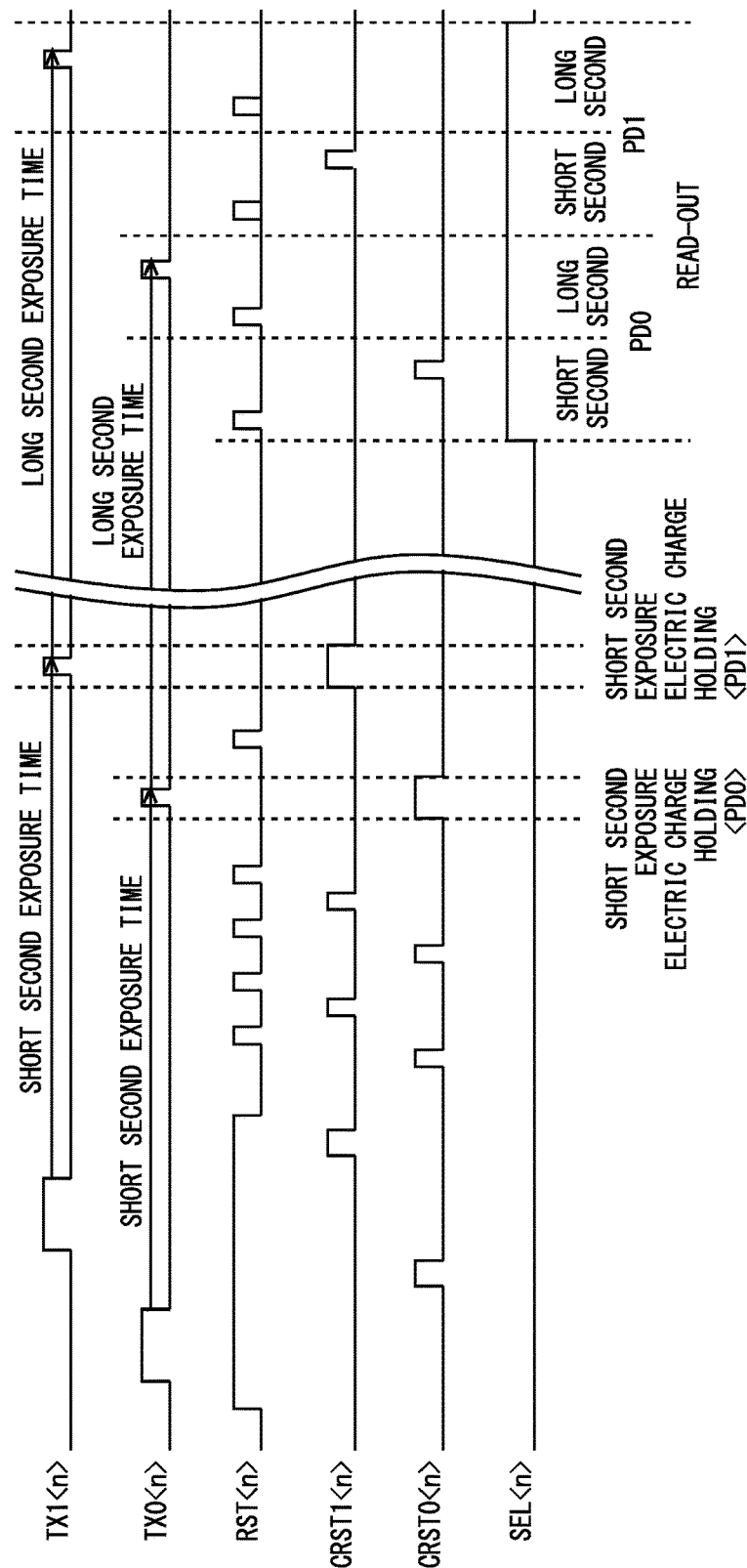
FIG. 10 is a timing diagram for explaining an operation in a first operation mode of the image sensor device according to the second embodiment.

FIG. 10 shows a timing diagram for explaining an operation in the first operation mode (e.g., the HDR mode) of the image sensor device according to the second embodiment. As shown in FIG. 10, in the second embodiment, the pixel control circuit 11 controls the pixel cell 20a in such a manner that the photodiode 21 and the photodiode 41 are given the exposure times of the same length. The pixel control circuit 11 controls the pixel cell 20a in such a manner that the exposure times are started at different timings and the pixel information is read from the photodiodes at different timings. In the example shown in FIG. 10, the pixel control circuit 11 controls the pixel cell 20a in such a manner that a first read-out period for reading out the short-second-exposure pixel information and long-second-exposure pixel information generated by the photodiode 21 is continuous with a second read-out period for reading out the shortsecond-exposure pixel information and long-second-exposure pixel information generated by the photodiode 41. Accordingly, in the example shown in FIG. 10, the pixel control circuit 11 controls the pixel cell 20*a* in such a manner that a lag time between the timing for starting the short second exposure for the photodiode 21 and the timing for starting the short second exposure for the photodiode 41 becomes equal to a time difference between the start timing of the first read-out period and the start timing of the second read-out period.

As shown in FIG. 10, the pixel control circuit 11 temporarily sets the reset signal RST for resetting the floating diffusion FD to the high level during the period between the period in which the pixel information is transferred from the photodiode 21 to the read-out capacitor 28 and the period in which the pixel information is transferred from the photodiode 41 to the read-out capacitor 48.

Further, in the image sensor device according to the second embodiment, the pixel control circuit 11 controls the pixel cell 20*a* in such a manner that the photodiode 21 and the photodiode 41 are exposed to light during a period in which at least exposure start timings are different from each other, and the pieces of pixel information output from the photodiode 21 and the photodiode 41 at different timings are respectively held in the read-out capacitor 28 and the read-out capacitor 48.

Figure 11:
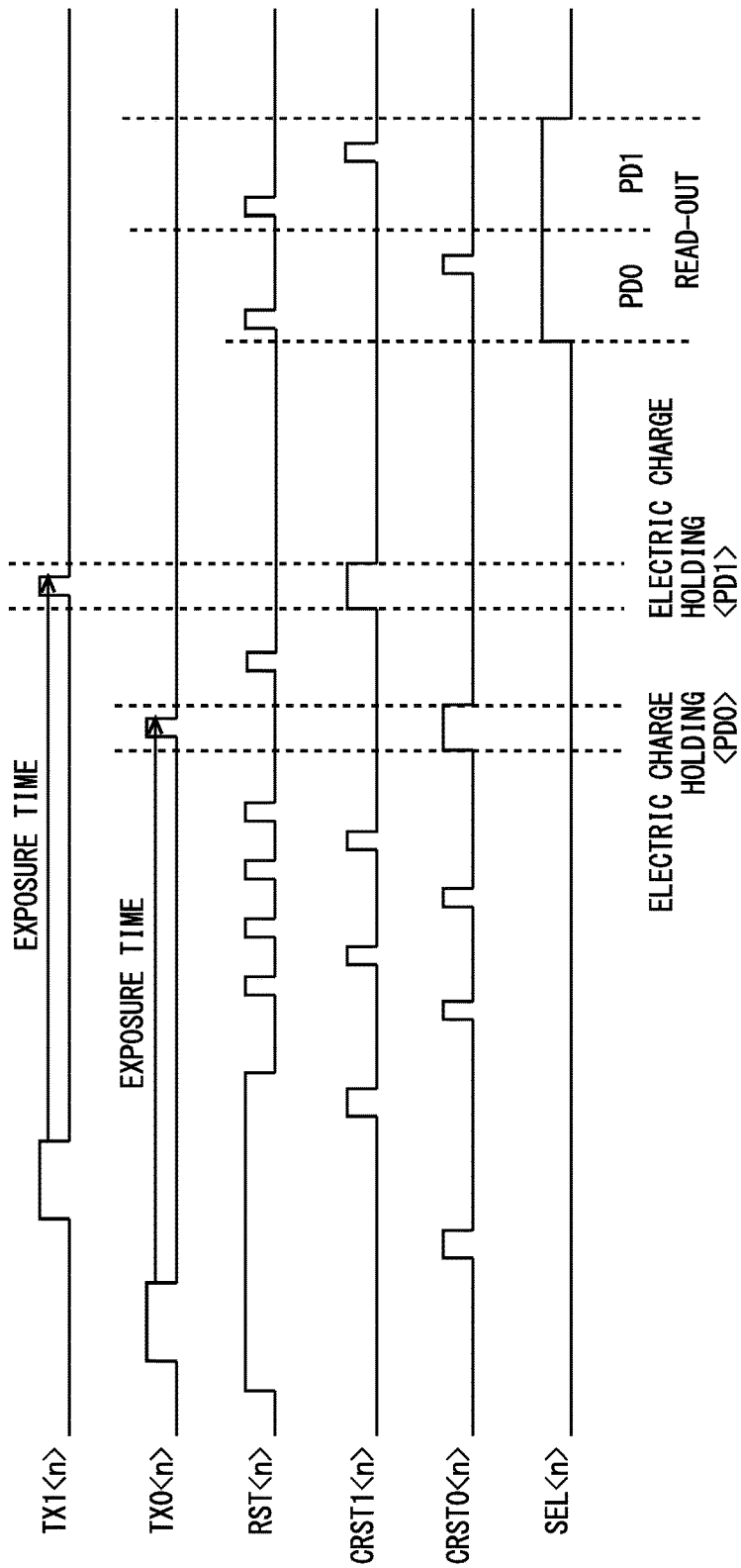
FIG. 11 is a timing diagram for explaining an operation in a second operation mode of the image sensor device according to the second embodiment.

FIG. 11 shows a timing diagram for explaining an operation in the second operation mode (e.g., the global shutter mode) of the image sensor device according to the second embodiment. As shown in FIG. 10, in the control sequence for the pixel cell 20*a* according to the second embodiment, the exposure periods for the photodiodes in one pixel cell are different from each other. Accordingly, in the control sequence for the pixel cell 20*a* according to the second embodiment, the pieces of pixel information generated by the two photodiodes in one pixel cell are held in the read-out capacitors 28 and 48, respectively, at different timings.

In the global shutter mode according to the second embodiment, there is no difference between the exposure timings of pixel cells arranged in different rows. Accordingly, in the global shutter mode according to the second embodiment, the simultaneity of pixels within an image deteriorates due to a difference between the exposure timings in one pixel cell. However, the deterioration in image quality due to deterioration in the simultaneity of pixels can be prevented by making the difference between the exposure periods sufficiently small.

Figure 12:
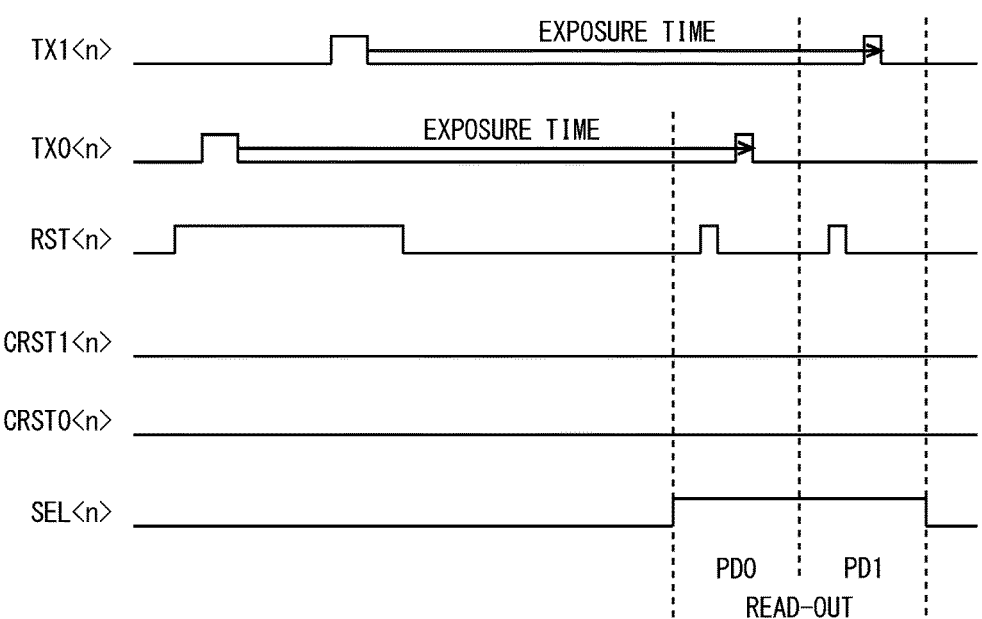
FIG. 12 is a timing diagram for explaining an operation in a third operation mode of the image sensor device according to the second embodiment.

FIG. 12 shows a timing diagram for explaining an operation in the third operation mode (e.g., the one-time-exposure rolling shutter mode) of the image sensor device according to the second embodiment. As shown in FIG. 12, the control sequence for the pixel cell 20*a* according to the second embodiment is the same as the control sequence for the pixel cell 20 according to the first embodiment, except that the exposure periods and the read-out timings of the photodiodes are different from each other in one pixel cell.

As described above, in the pixel cell 20*a* according to the second embodiment, two photodiodes share the node reset transistor 23, the amplification transistor 24, and the selection transistor 25. Accordingly, when the pixel cell 20*a* according to the second embodiment is used, the number of transistors per photodiode can be reduced. In the pixel cell 20*a* shown in FIG. 9, the number of transistors per photodiode is 3.5. Like in the pixel cell 20 according to the first embodiment, the read-out capacitors 28 and 48 in the pixel cell 20*a* according to the second embodiment are each formed using a wiring capacitance, and thus an increase in the area due to the addition of the read-out capacitor 48 is very small. Accordingly, in the pixel cell 20*a* according to the second embodiment, the circuit area can be reduced by reducing the number of transistors per photodiode.

Like in the image sensor device 1 according to the first embodiment, the three operation modes can be achieved by using the pixel cell 20*a* according to the second embodiment.

Third Embodiment

Figure 13:
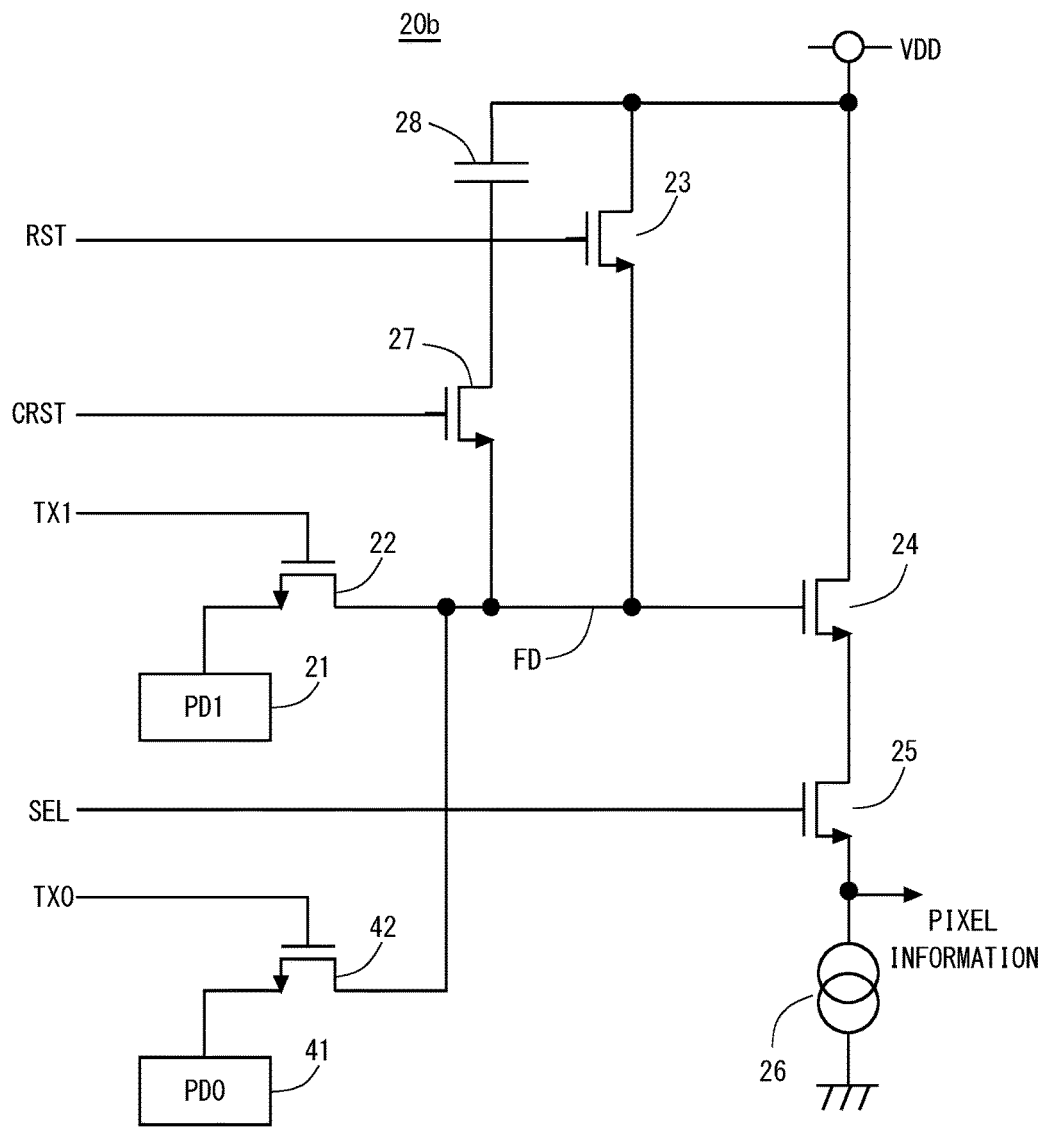
FIG. 13 is a circuit diagram showing a pixel cell of an image sensor device according to a third embodiment.

In a third embodiment, a pixel cell 20*b* will be described as still another form of the pixel cell 20. FIG. 13 shows a circuit diagram of a pixel cell of an image sensor device according to the third embodiment. The components in the second embodiment that are the same as those described in the first embodiment are denoted by the same reference numerals, and descriptions thereof are omitted.

As shown in FIG. 13, the pixel cell 20*b* according to the third embodiment has a configuration in which the photodiode 41 and the transfer transistor 42 are added to the pixel cell 20 according to the first embodiment. Assuming that the photodiode 21 is a first photodiode, the photodiode 41 is referred to as a second photodiode. Assuming that the transfer transistor 22 is a first transfer transistor, the transfer transistor 42 is referred to as a second transfer transistor.

The transfer transistor 42 is provided between the photodiode 41 and the floating diffusion FD. The gate of the transfer transistor 42 is supplied with the transfer control signal TX0. The gate of the transfer transistor 22 is supplied with the transfer control signal TX1.

In the image sensor device 1, color filters are formed in an upper layer of the pixel array 10, and color components of light incident on each photodiode are determined. FIG. 14 shows a diagram for explaining the relationship between the arrangement of pixel cells and the arrangement of color filters provided in the image sensor device according to the third embodiment. Referring to FIG. 14, a color filter B transmits blue light; color filters G1 and G0 transmit green light; and a color filter R transmits red light. The filters of the respective colors are arranged in a Bayer array. Each color filter corresponds to one photodiode. The row numbers shown in FIG. 14 are the row numbers of each row in which the pixel cells 20*b* are arranged.

Figure 15:
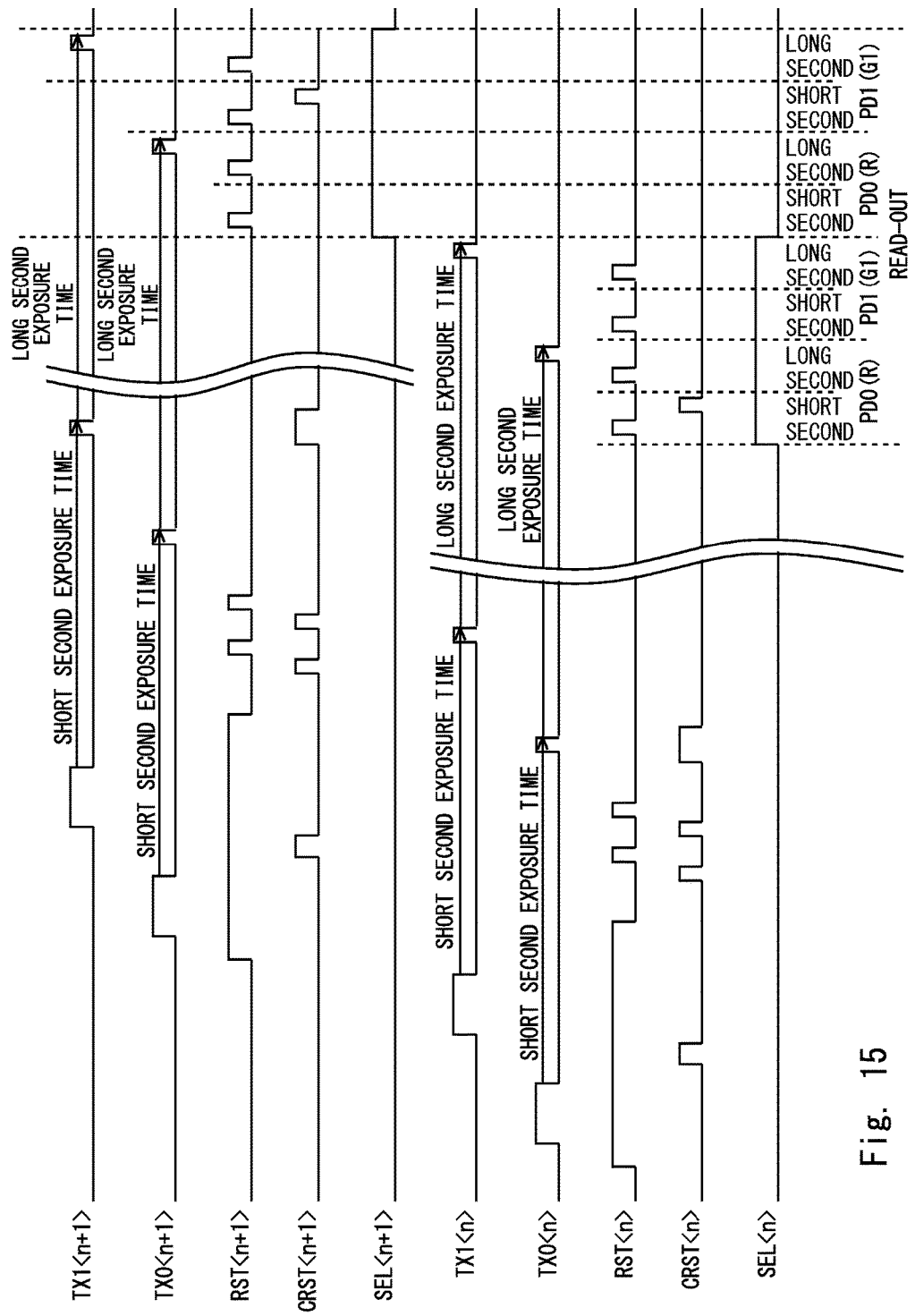
FIG. 15 is a timing diagram for explaining an operation in a first operation mode of the image sensor device according to the third embodiment.

Next, the control sequence for the pixel cell 20*b* according to the third embodiment will be described. FIG. 15 shows a timing diagram for explaining an operation in the first operation mode (e.g., the HDR mode) of the image sensor device according to the third embodiment.

As shown in FIG. 15, the control sequence for the pixel cell 20*b* according to the third embodiment is the same as the control sequence for the pixel cell 20*a* according to the second embodiment, except that one of the two pieces of short-second-exposure pixel information generated by the photodiodes 21 and 41 is not held in the read-out capacitor 28 and the pixel information which is not held in the read-out capacitor 28 is not output.

Figure 16:
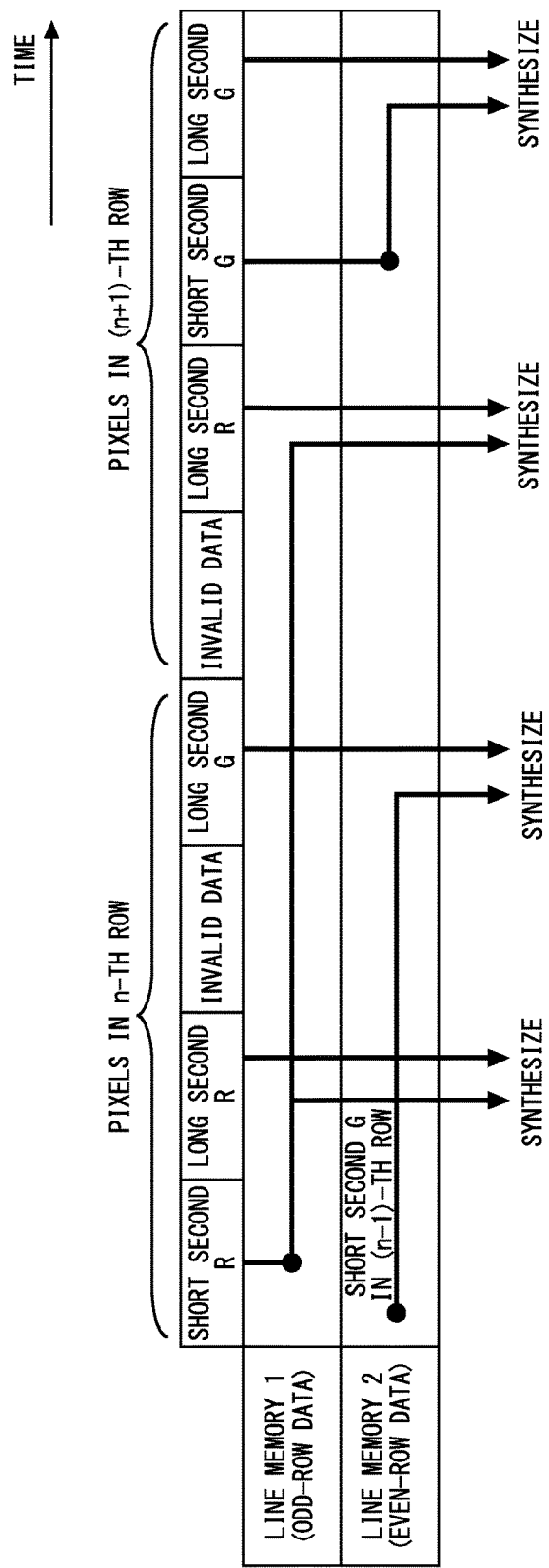
FIG. 16 is a diagram for explaining processing for synthesizing pixel information in the first operation mode of the image sensor device according to the third embodiment.

The pixel cell 20*b* according to the third embodiment is provided with only one read-out capacitor, which causes a problem that one of the pieces of short-second-exposure pixel information is missing. Accordingly, in the image sensor device according to the third embodiment, the missing short-second-exposure pixel information is complemented by the short-second-exposure pixel information corresponding to the filter of the same color as that of the missing short-second-exposure pixel information in another row. FIG. 16 shows a diagram for explaining processing for synthesizing pixel information in the HDR mode of the image sensor device according to the third embodiment.

In the example shown in FIG. 16, the short-second-exposure pixel information of the photodiode 21 (green filter) in the pixel cells in the n-th row is missing. Accordingly, in the image sensor device 1 according to the third embodiment, the missing pixel information in the pixel cells in the n-th row is complemented by the short-second-exposure pixel information of the photodiode 21 (green filter) in the pixel cells in an (n−1)-th row.

In the example shown in FIG. 16, the short-second-exposure pixel information of the photodiode 21 (red filter) in the pixel cells in an (n+1)-th row is missing. Accordingly, in the image sensor device 1 according to the third embodiment, the missing pixel information in the pixel cells in the (n+1)-th row is complemented by the short-second-exposure pixel information of the photodiode 21 (red filter) in the pixel cells in the n-th row.

Specifically, in the image sensor device according to the third embodiment, the pixel control circuit 11 controls the pixel cell 20b in such a manner that, in the HDR mode, when the pixel information output from one of the photodiodes 41 and 21 exposed to light with the first exposure time in the pixel cells 20b belonging to the first row (for example, the n-th row) is accumulated in the read-out capacitor 28 as the first pixel information, the pixel information output from the other one of the photodiodes 41 and 21 exposed to light with the first exposure in the pixel cells 20b belonging to the second row (for example, the (n+1)-th row) adjacent to the first row is accumulated in the read-out capacitor 28 as the first pixel information.

The image sensor device 1 according to the third embodiment includes an image generation unit (e.g., the line memory 16 and the adder 17) that generates the output image information by synthesizing the first pixel information with the second pixel information. Assuming that n represents the row number of each row in which the pixel cells 20b are arranged, the image generation unit generates the output image information in such a manner that the pixel information output from the photodiode 21 included in the pixel cells 20b in the n-th row is complemented by the pixel information output from the photodiode 21 included in the pixel cells 20b in the (n−1)-th row. The image generation unit generates the output image information in such a manner that the pixel information output from the photodiode 41 included in the pixel cells 20b in the (n+1)-th row is complemented by the pixel information output from the photodiode 41 included in the pixel cells 20b in the n-th row.

Figure 17:
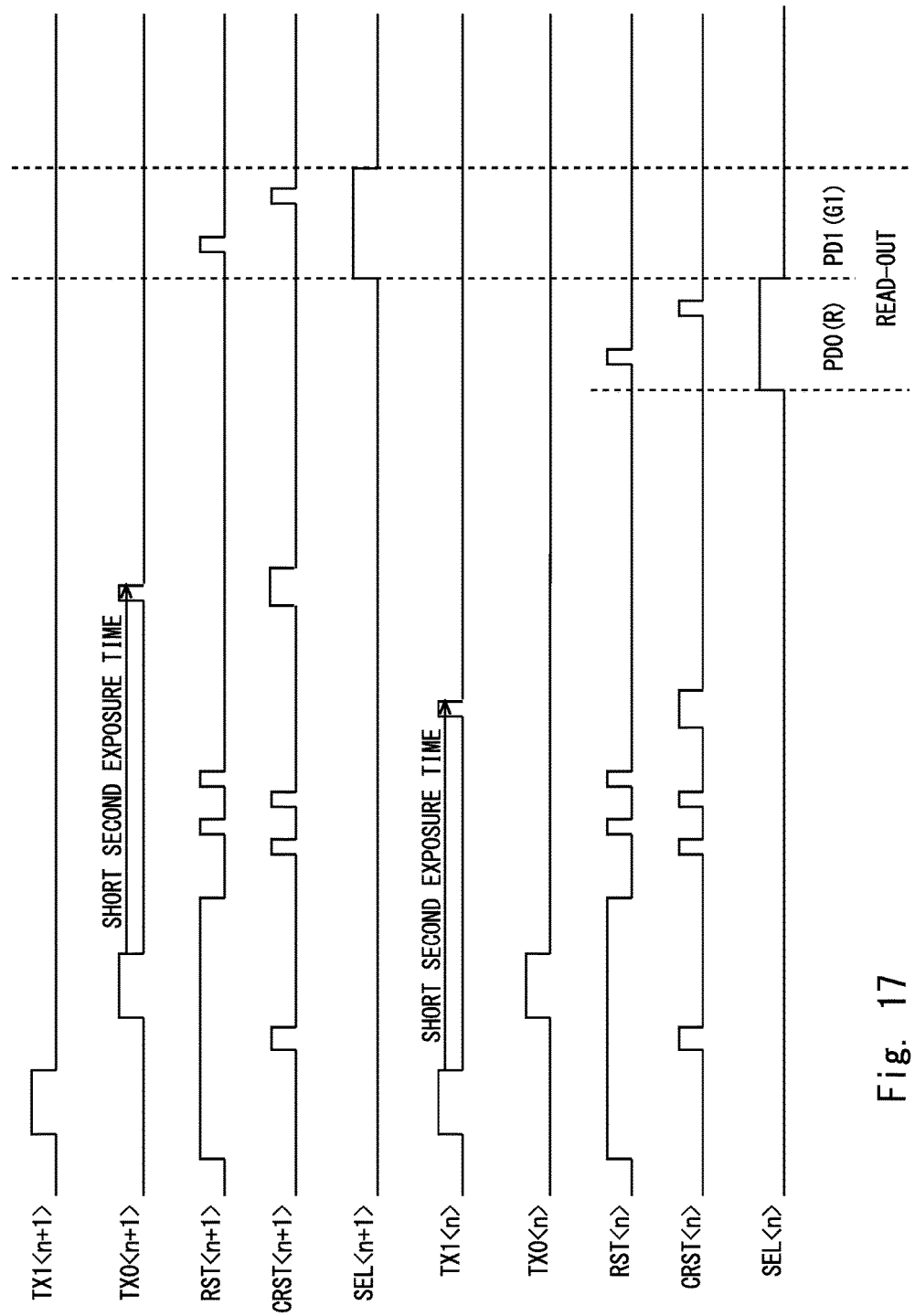
FIG. 17 is a timing diagram for explaining an operation in a second operation mode of the image sensor device according to the third embodiment.

FIG. 17 shows a timing diagram for explaining an operation in the second operation mode (e.g., the global shutter mode) of the image sensor device according to the third embodiment. As shown in FIG. 15, in the third embodiment, when the image sensor device is caused to operate in the global shutter mode, the pixel control circuit 11 controls the pixel cells 20b. Specifically, the pixel control circuit 11 causes one of the photodiodes 41 and 21 to be exposed to light in the pixel cells 20b in the n-th row, and causes the other one of the photodiodes 41 and 21 to be exposed to light in the pixel cells 20b in the (n+1)-th row. The other control sequence is the same as that of the image sensor device according to the second embodiment shown in FIG. 11.

Figure 18:
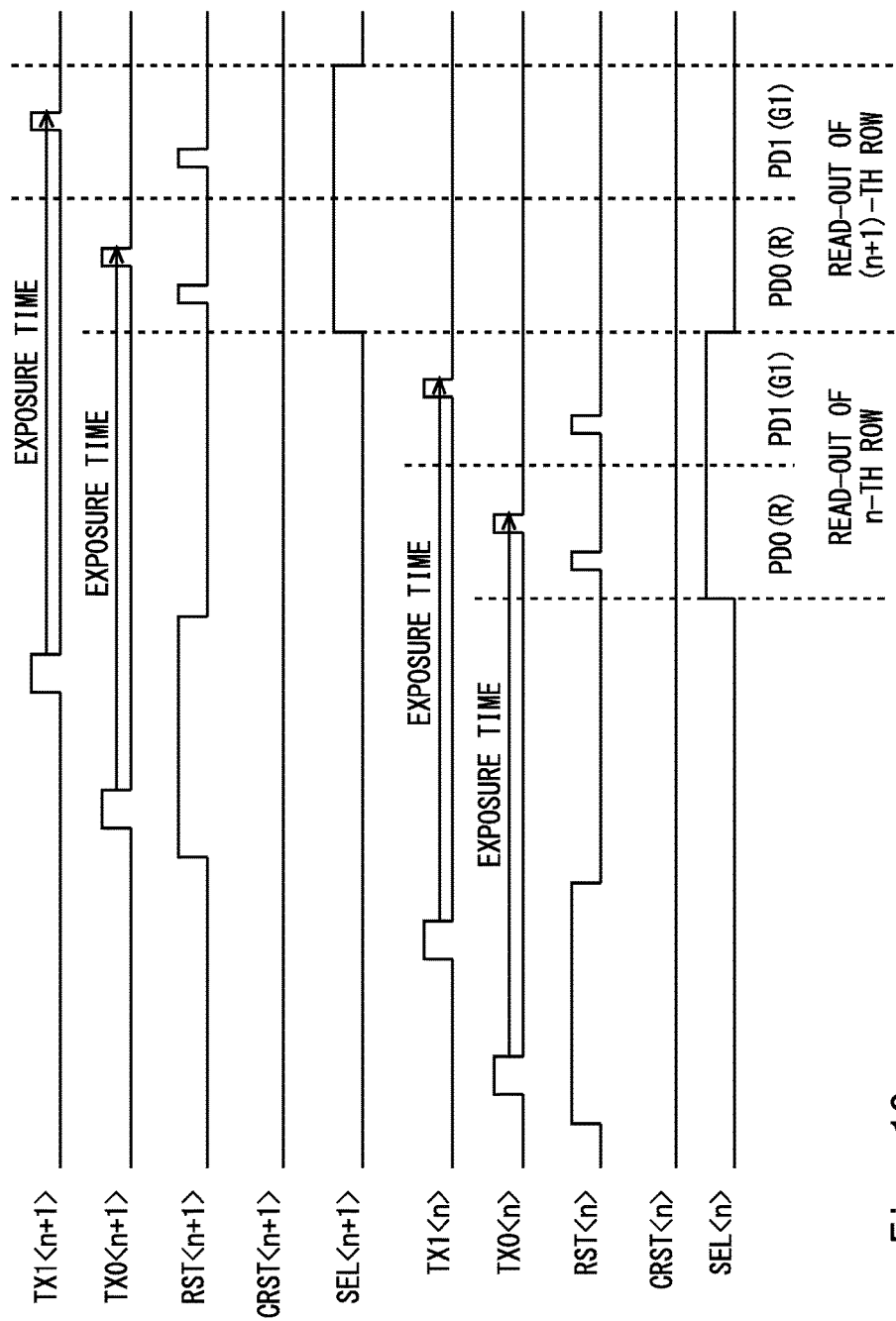
FIG. 18 is a timing diagram for explaining an operation in a third operation mode of the image sensor device according to the third embodiment.

FIG. 18 shows a timing diagram for explaining an operation in the third operation mode (e.g., the one-time-exposure rolling shutter mode) of the image sensor device according to the third embodiment. As shown in FIG. 18, the operation in the one-time-exposure rolling shutter mode of the image sensor device according to the third embodiment is also the same as that of the image sensor device according to the second embodiment.

As described above, in the image sensor device according to the third embodiment, the number of pieces of pixel information to be obtained is reduced, thereby making it possible to reduce the number of elements constituting the circuit, in comparison with the image sensor device according to the second embodiment. Further, unavailable pixel information can be obtained by complementation processing, which contributes to a reduction in the deterioration of the image quality.

Fourth Embodiment

In a fourth embodiment, another form of the method for complementing pixel information in the mage sensor device according to the third embodiment will be described. More specifically, the method for complementing pixel information according to the fourth embodiment is effective especially during photographing of a moving image.

Figure 19:
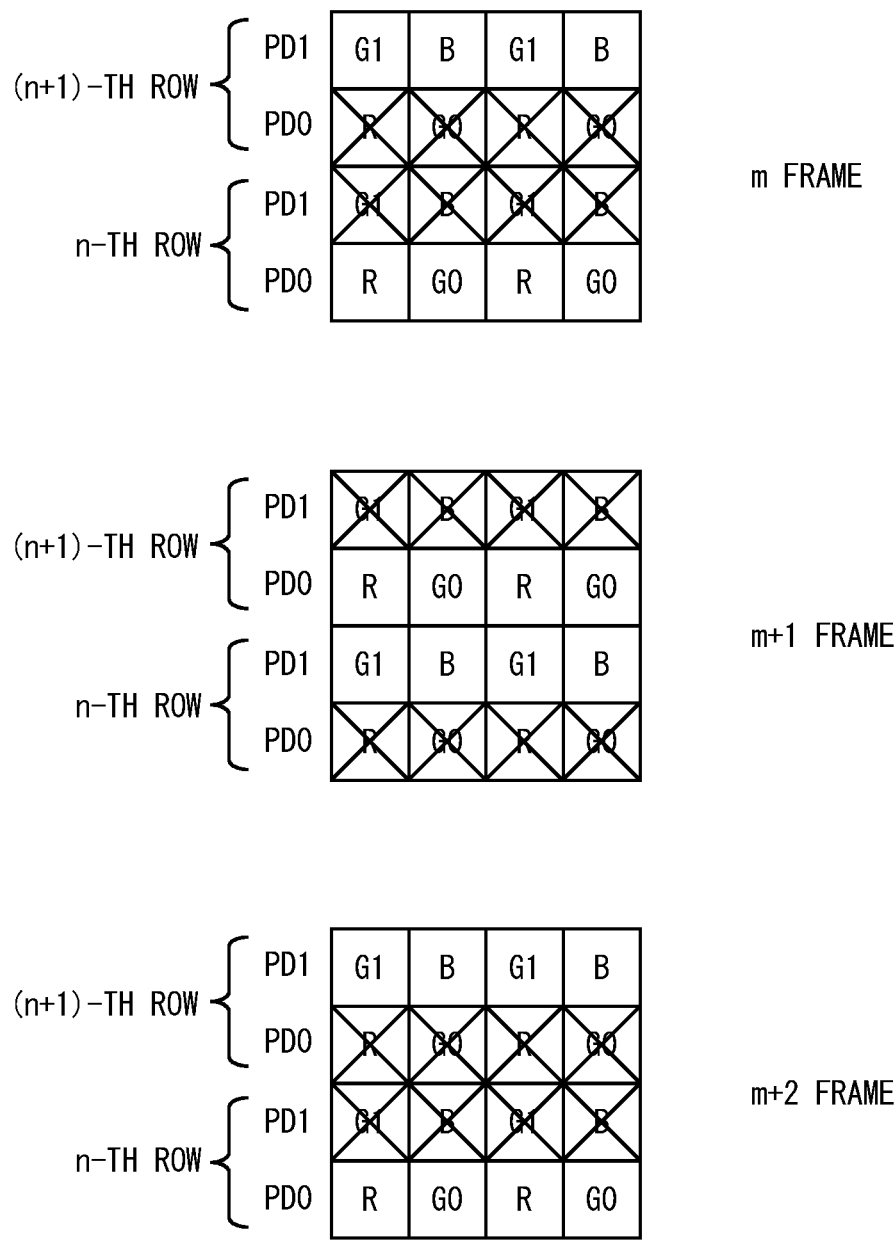
FIG. 19 is a diagram for explaining pixel complementation processing in an image sensor device according to a fourth embodiment.

FIG. 19 shows a diagram for explaining pixel complementation processing in the image sensor device according to the fourth embodiment. FIG. 19 shows only the short-second-exposure pixel information in the pixel information output from the pixel cells 20b. In FIG. 19, m represents a frame number. As shown in FIG. 19, in the pixel complementation processing according to the fourth embodiment, the pixel control circuit 11 switches the photodiodes to output the pixel information to be held in the read-out capacitor 28 for each frame. In the example shown in FIG. 19, assuming that m represents an odd frame, the pixel control circuit 11 holds, in the read-out capacitor 28, the pixel information generated by the photodiode 21 in an odd frame, and also holds, in the read-out capacitor 28, the pixel information generated by the photodiode 41 in an even frame.

By switching the photodiodes to output the short-second-exposure pixel information to be held in the read-out capacitor 28 for each frame as described above, the deterioration in visual resolution due to an interlacing effect caused when the frames are displayed as a moving image can be prevented.

Fifth Embodiment

In a fifth embodiment, still another form of the method for complementing pixel information in the image sensor devices according to the third and fourth embodiments will be described.

Figure 20:
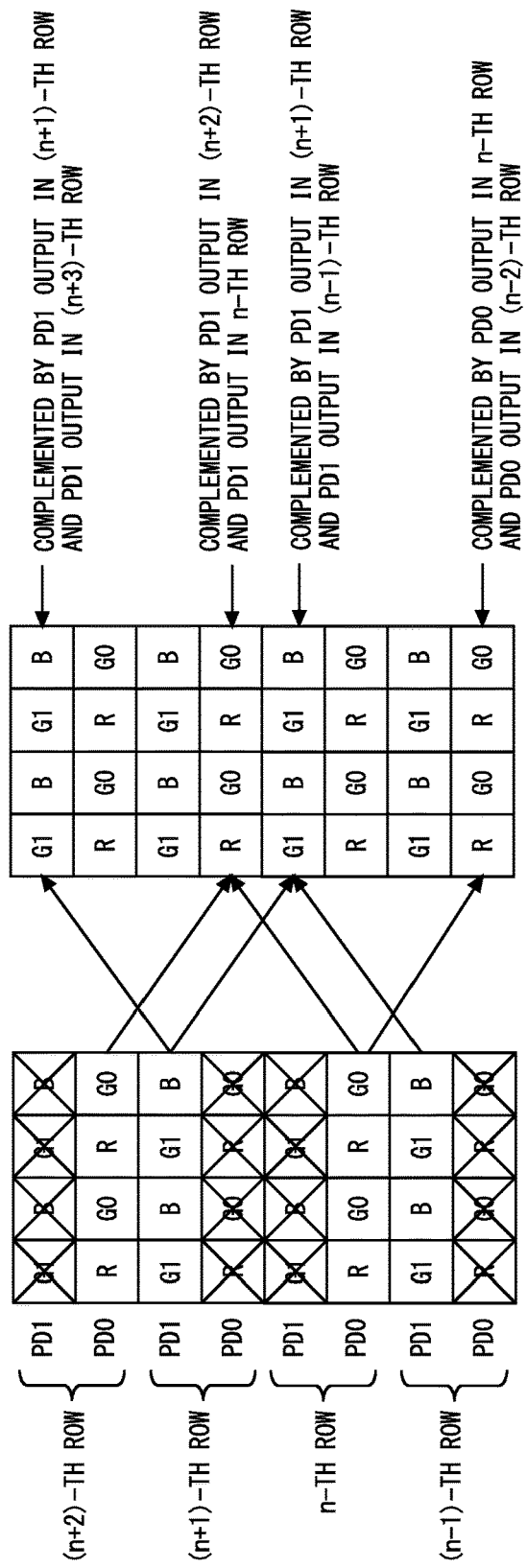
FIG. 20 is a diagram for explaining pixel complementation processing in an image sensor device according to a fifth embodiment.

FIG. 20 shows a diagram for explaining pixel complementation processing in the image sensor device according to the fifth embodiment. FIG. 20 shows only the short-second-exposure pixel information in the pixel information output from the pixel cells 20b.

As shown in FIG. 20, in the method for complementing pixel information according to the fifth embodiment, pieces of pixel information corresponding to complementation target pixels are obtained from the pixel cells located in rows preceding and following the row of pixel cells that have output the pixel information to be complemented, and missing pixel information is generated using an average value of the two pieces of pixel information.

Specifically, in the fifth embodiment, assuming that n represents the row number of each row in which pixel cells are arranged, the image generation unit (e.g., the line memory 16 and the adder 17) generates the output image information in such a manner that the pixel information output from an invalid photodiode for which no pixel information is held in the read-out capacitor in the pixel cells in the n-th row is complemented by the pixel information output from the photodiode which is included in the pixel cells in the (n−1)-th row and the (n+1)-th row and corresponds to the invalid photodiode.

As described above, in the method for complementing pixel information according to the fifth embodiment, the pixel information used for complementation is obtained from the pixel cells preceding and following the pixel cell to which the pixel information to be complemented belongs. Thus, in the method for complementing pixel information according to the fifth embodiment, the pixel cells based on which the complementation processing is performed can be appropriately set as compared with the third and fourth embodiments. Consequently, the method for complementing pixel information according to the fifth embodiment can improve the image quality of the output image information.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

For example, the circuits constituting the pixel cells of the image sensor devices according to the embodiments described above, the conductivity type (p-type or n-type) of a semiconductor substrate, a semiconductor layer, a diffusion layer (diffusion region), and the like may be reversed. Accordingly, when one of the conductivity types of the n-type and the p-type is defined as a first conductivity type and the other conductivity type is defined as a second conductivity type, the first conductivity type may be the p-type and the second conductivity type may be the n-type. On the contrary, the first conductivity type may be the n-type and the second conductivity type may be the p-type.

The first to fifth embodiments can be combined as desirable by one of ordinary skill in the art.

What is claimed is:

1. An image sensor device, comprising:
    a plurality of pixel cells arranged in a matrix in a pixel array; and
    a timing control circuit that controls read-out of pixel information from the plurality of pixel cells,
    wherein each of the plurality of pixel cells includes:
        a photodiode;
        a transfer transistor provided between the photodiode and a floating diffusion;
        a node reset transistor provided between a power supply terminal and the floating diffusion;
        a read-out capacitor whose one end is connected to the power supply terminal;
        a capacitor reset transistor provided between another end of the read-out capacitor and the floating diffusion;
        an amplification transistor that amplifies a voltage generated based on electric charges accumulated in the floating diffusion; and
        a selection transistor provided between the amplification transistor and a read-out line,
    wherein, when the timing control circuit operates in a first operation mode to generate output image information by synthesizing results obtained by performing an exposure on the photodiode a plurality of times with different exposure times, the timing control circuit controls the pixel cells in such a manner that:
        the transfer transistor is switched to a cut-off state and the photodiode is exposed to light with a first exposure time, and then the capacitor reset transistor and the transfer transistor are switched to a conductive state to cause electric charges accumulated in the photodiode to be accumulated in the read-out capacitor;
        the capacitor reset transistor and the transfer transistor are switched from the conductive state to the cut-off state and the photodiode is further exposed to light with a second exposure time;
        a first read-out operation for switching the selection transistor and the capacitor reset transistor from the cut-off state to the conductive state during a period of the second exposure time and for outputting first pixel information accumulated in the read-out capacitor to the read-out line is performed; and
        a second read-out operation for switching the capacitor reset transistor to the cut-off state after a lapse of the second exposure time and for switching the transfer transistor and the selection transistor to the conductive state to cause second pixel information to be output to the read-out line from the photodiode is performed,
    wherein the photodiode includes a first photodiode and a second photodiode,
    wherein the transfer transistor includes a first transfer transistor and a second transfer transistor,
    wherein the read-out capacitor includes a first read-out capacitor and a second read-out capacitor,
    wherein the capacitor reset transistor includes a first capacitor reset transistor and a second capacitor reset transistor,
    wherein the first transfer transistor is provided between the first photodiode and the floating diffusion,
    wherein the second transfer transistor is provided between the second photodiode and the floating diffusion,
    wherein one end of the first read-out capacitor is connected to the power supply terminal, and another end of the first read-out capacitor is connected to the floating diffusion via the first capacitor reset transistor, and
    wherein one end of the second read-out capacitor is connected to the power supply terminal, and another end of the second read-out capacitor is connected to the floating diffusion via the second capacitor reset transistor.

2. The image sensor device according to claim 1, wherein the timing control circuit controls the pixel cells in such a manner that the first photodiode and the second photodiode are exposed to light during a period in which at least exposure start timings are different from each other, and pieces of image information output from the first photodiode and the second photodiode at different timings are respectively held in the first read-out capacitor and the second read-out capacitor.

3. An image sensor device, comprising:
    a plurality of pixel cells arranged in a matrix in a pixel array; and
    a timing control circuit that controls read-out of pixel information from the plurality of pixel cells,
    wherein each of the plurality of pixel cells includes:
        a photodiode;

a transfer transistor provided between the photodiode and a floating diffusion;

a node reset transistor provided between a power supply terminal and the floating diffusion;

a read-out capacitor whose one end is connected to the power supply terminal;

a capacitor reset transistor provided between another end of the read-out capacitor and the floating diffusion;

an amplification transistor that amplifies a voltage generated based on electric charges accumulated in the floating diffusion; and a selection transistor provided between the amplification transistor and a read-out line, wherein, when the timing control circuit operates in a first operation mode to generate output image information by synthesizing results obtained by performing an exposure on the photodiode a plurality of times with different exposure times, the timing control circuit controls the pixel cells in such a manner that:

the transfer transistor is switched to a cut-off state and the photodiode is exposed to light with a first exposure time, and then the capacitor reset transistor and the transfer transistor are switched to a conductive state to cause electric charges accumulated in the photodiode to be accumulated in the read-out capacitor;

the capacitor reset transistor and the transfer transistor are switched from the conductive state to the cut-off state and the photodiode is further exposed to light with a second exposure time;

a first read-out operation for switching the selection transistor and the capacitor reset transistor from the cut-off state to the conductive state during a period of the second exposure time and for outputting first pixel information accumulated in the read-out capacitor to the read-out line is performed; and a second read-out operation for switching the capacitor reset transistor to the cut-off state after a lapse of the second exposure time and for switching the transfer transistor and the selection transistor to the conductive state to cause second pixel information to be output to the read-out line from the photodiode is performed, wherein the photodiode includes a first photodiode and a second photodiode, wherein the transfer transistor includes a first transfer transistor and a second transfer transistor, wherein the first transfer transistor is provided between the first photodiode and the floating diffusion, and wherein the second transfer transistor is provided between the second photodiode and the floating diffusion.

4. The image sensor device according to claim 3, wherein, in the first operation mode, the timing control circuit controls the pixel cells in such a manner that when pixel information output from one of the first and second photodiodes exposed to light with the first exposure time in the pixel cells belonging to a first row is accumulated in the read-out capacitor as the first pixel information, pixel information output from an other one of the first and second photodiodes exposed to light with the first exposure time in the pixel cells belonging to a second row adjacent to the first row is accumulated in the read-out capacitor as the first pixel information.

5. The image sensor device according to claim 4, wherein the timing control circuit switches the photodiodes to output pixel information to be held in the read-out capacitor for each frame.

6. The image sensor device according to claim 4, further comprising an image generation unit that generates the output image information by synthesizing the first pixel information with the second pixel information, Wherein, when n represents a row number of a row in which the pixel cells are arranged, the image generation unit generates the output image information by complementing pixel information output from the second photodiode included in the pixel cells in an n-th row by pixel information output from the second photodiode included in the pixel cells arranged in an (n−1)-th row, and the image generation unit generates the output image information by complementing pixel information output from the first photodiode included in the pixel cells in an (n+1)-th row by pixel information output from the first photodiode included in the pixel cells in the n-th row.

7. The image sensor device according to claim 4, further comprising an image generation unit that generates the output image information by synthesizing the first pixel information with the second pixel information, Wherein, when n represents a row number of a row in which the pixel cells are arranged, the image generation unit generates the output image information in such a manner that pixel information output from an invalid photodiode for which no pixel information is held in the read-out capacitor in the pixel cells in the n-th row is complemented by pixel information output from a photodiode corresponding to the invalid photodiode.

8. The image sensor device according to claim 3, wherein, when the timing control circuit operates in the second operation mode to generate the output image information based on a result of simultaneously performing an exposure on the photodiodes belonging to a plurality of rows, when n represents a row number of a row in which the pixel cells are arranged, the timing control circuit causes one of the first and second photodiodes in the pixel cells in an n-th row to be exposed to light, and causes an other one of the first and second photodiodes in the pixel cells in an (n+1)-th row to be exposed to light.

* * * * *